(12) United States Patent
Siagian et al.

(10) Patent No.: US 11,586,164 B2
(45) Date of Patent: Feb. 21, 2023

(54) METHOD OF ILLUMINATING AN ARTICLE

(71) Applicant: NIKE, Inc., Beaverton, OR (US)

(72) Inventors: Parluhutan Siagian, Portland, OR (US); Doug D. Wilken, Hillsboro, OR (US)

(73) Assignee: NIKE, Inc., Beaverton, OR (US)

( * ) Notice: Subject to any disclaimer, the term of this patent is extended or adjusted under 35 U.S.C. 154(b) by 81 days.

(21) Appl. No.: 17/092,945

(22) Filed: Nov. 9, 2020

(65) Prior Publication Data

US 2021/0059026 A1    Feb. 25, 2021

Related U.S. Application Data

(63) Continuation of application No. 16/382,556, filed on Apr. 12, 2019, now Pat. No. 10,841,993, which is a continuation of application No. 14/744,180, filed on Jun. 19, 2015, now Pat. No. 10,306,726.

(51) Int. Cl.
| | |
|---|---|
| *G05B 15/02* | (2006.01) |
| *A43B 13/20* | (2006.01) |
| *H05B 45/20* | (2020.01) |
| *H05B 47/19* | (2020.01) |
| *A43B 3/36* | (2022.01) |

(52) U.S. Cl.
CPC ............... *G05B 15/02* (2013.01); *A43B 3/36* (2022.01); *A43B 13/20* (2013.01); *H05B 45/20* (2020.01); *H05B 47/19* (2020.01)

(58) Field of Classification Search
None
See application file for complete search history.

(56) References Cited

U.S. PATENT DOCUMENTS

| | | | |
|---|---|---|---|
| 3,800,133 | A | 3/1974 | Duval |
| 3,893,247 | A | 7/1975 | Dana, III |
| 4,014,115 | A | 3/1977 | Reichert |
| 4,020,572 | A | 5/1977 | Chiaramonte, Jr. |
| 4,112,601 | A | 9/1978 | Chiaramonte, Jr. |

(Continued)

FOREIGN PATENT DOCUMENTS

| | | |
|---|---|---|
| CN | 2744198 Y | 12/2005 |
| CN | 2775990 Y | 4/2006 |

(Continued)

OTHER PUBLICATIONS

European Patent Office as the International Searching Authority, International Search Report and Written Opinion for PCT Application No. PCT/US2016/036399, dated Feb. 20, 2017.

(Continued)

*Primary Examiner* — Crystal L Hammond
(74) *Attorney, Agent, or Firm* — Honigman LLP; Matthew H. Szalach; Jonathan P. O'Brien

(57) ABSTRACT

An article of footwear may have an upper and a sole system secured to the upper. The sole system includes a bladder member with an illumination device. The bladder member is formed from at least a partially transparent or colored outer polymer layer that encloses a fluid. The illumination device is located within the sole system. Light from the illumination device may pass out the sole system by passing through the bladder member, thereby imparting the configuration of an illuminable fluid-filled bladder member.

19 Claims, 23 Drawing Sheets

(56) References Cited

U.S. PATENT DOCUMENTS

| | | |
|---|---|---|
| 4,130,951 A | 12/1978 | Powell |
| 4,158,922 A | 6/1979 | Dana, III |
| 4,183,156 A | 1/1980 | Rudy |
| 4,219,945 A | 9/1980 | Rudy |
| 4,936,029 A | 6/1990 | Rudy |
| 5,042,176 A | 8/1991 | Rudy |
| 5,357,697 A | 10/1994 | Lin |
| 5,381,615 A | 1/1995 | MacMillan |
| 5,490,338 A | 2/1996 | Hwang et al. |
| 5,644,858 A | 7/1997 | Bemis |
| 5,704,706 A | 1/1998 | Goldston et al. |
| 5,709,464 A | 1/1998 | Tseng |
| 5,713,141 A | 2/1998 | Mitchell et al. |
| 5,716,723 A | 2/1998 | Van Cleef et al. |
| 5,732,486 A | 3/1998 | Rapisarda |
| 5,746,499 A | 5/1998 | Ratcliffe et al. |
| 5,758,946 A | 6/1998 | Chen |
| 5,771,611 A | 6/1998 | Chang |
| 5,815,955 A | 10/1998 | Wu |
| 5,865,523 A | 2/1999 | Chien |
| 5,866,987 A | 2/1999 | Wut |
| 5,879,069 A | 3/1999 | Chien |
| 5,894,201 A | 4/1999 | Wong |
| 5,903,103 A | 5/1999 | Garner |
| 5,909,088 A | 6/1999 | Wut |
| 5,930,921 A | 8/1999 | Sorofman et al. |
| 5,932,975 A | 8/1999 | Wut |
| 5,945,911 A | 8/1999 | Healy et al. |
| 5,947,580 A | 9/1999 | Chien |
| 5,952,065 A | 9/1999 | Mitchell et al. |
| 6,012,822 A | 1/2000 | Robinson |
| 6,013,340 A | 1/2000 | Bonk et al. |
| 6,017,128 A | 1/2000 | Goldston et al. |
| 6,082,025 A | 7/2000 | Bonk et al. |
| 6,112,437 A | 9/2000 | Lovitt |
| 6,127,026 A | 10/2000 | Bonk et al. |
| 6,203,868 B1 | 3/2001 | Bonk et al. |
| RE37,220 E | 6/2001 | Rapisarda et al. |
| 6,280,045 B1 | 8/2001 | Anteby et al. |
| 6,321,465 B1 | 11/2001 | Bonk et al. |
| 6,511,198 B1 | 1/2003 | Erickson |
| 6,525,487 B2 | 2/2003 | Wei |
| 6,619,812 B2 | 9/2003 | Rapisarda |
| 6,764,193 B1 | 7/2004 | Wei |
| 6,776,498 B2 | 8/2004 | Yeung |
| 6,789,913 B2 | 9/2004 | Wei |
| 6,837,590 B2 | 1/2005 | Marston |
| 6,969,291 B2 | 11/2005 | Urabe et al. |
| 7,016,867 B2 | 3/2006 | Lyden |
| 7,029,140 B2 | 4/2006 | Wong et al. |
| 7,032,331 B2 | 4/2006 | Tsai |
| 7,059,739 B2 | 6/2006 | Wong |
| 7,075,226 B2 | 7/2006 | Cok |
| 7,108,389 B1 | 9/2006 | Fu |
| 7,141,131 B2 | 11/2006 | Foxen et al. |
| 7,170,019 B2 | 1/2007 | Wong et al. |
| D554,848 S | 11/2007 | Marston |
| 7,329,019 B2 | 2/2008 | Cheung |
| 7,347,577 B1 | 3/2008 | Rapisarda |
| 7,405,674 B2 | 7/2008 | Tseng et al. |
| 7,428,471 B2 | 9/2008 | Darley et al. |
| 7,494,237 B1 | 2/2009 | Cheung |
| 7,500,761 B2 | 3/2009 | Tseng |
| 7,611,547 B2 | 11/2009 | Bracken et al. |
| 7,752,775 B2 | 7/2010 | Lyden |
| 7,771,320 B2 | 8/2010 | Riley et al. |
| 7,794,101 B2 | 9/2010 | Galica et al. |
| 7,937,856 B2 | 5/2011 | Cook et al. |
| 8,112,251 B2 | 2/2012 | Case, Jr. et al. |
| 8,327,561 B1 | 12/2012 | Smith, III |
| 8,356,430 B2 | 1/2013 | Beers |
| 8,459,821 B1 | 6/2013 | Fusilier |
| 8,469,535 B2 | 6/2013 | Guzman |
| 2001/0049890 A1 | 12/2001 | Hirsch et al. |
| 2003/0126769 A1 | 7/2003 | Chen |
| 2003/0137258 A1 | 7/2003 | Piepgras et al. |
| 2004/0032734 A1 | 2/2004 | Chen |
| 2004/0114353 A1 | 6/2004 | Romeo |
| 2004/0130887 A1 | 7/2004 | Wei |
| 2004/0255490 A1* | 12/2004 | Wan ................ A43B 1/0072 36/137 |
| 2005/0286244 A1 | 12/2005 | Weng |
| 2005/0286248 A1 | 12/2005 | Weng |
| 2006/0133067 A1 | 6/2006 | Tsai |
| 2006/0174521 A1 | 8/2006 | Lee |
| 2006/0196089 A1* | 9/2006 | Guzman ............ A43B 1/0036 36/137 |
| 2006/0221597 A1 | 10/2006 | Hutchinson |
| 2006/0230641 A1* | 10/2006 | Vick ................ A43B 1/0036 36/137 |
| 2007/0021269 A1 | 1/2007 | Shum |
| 2007/0151125 A1 | 7/2007 | Tsai et al. |
| 2007/0206375 A1 | 9/2007 | Piepgras et al. |
| 2007/0222370 A1 | 9/2007 | Zhu et al. |
| 2008/0019119 A1 | 1/2008 | Marston |
| 2008/0117624 A1 | 5/2008 | Kirkov |
| 2009/0019713 A1 | 1/2009 | Sullivan |
| 2009/0109659 A1 | 4/2009 | Harris |
| 2009/0158622 A1 | 6/2009 | Cook et al. |
| 2009/0193689 A1* | 8/2009 | Galica ................ A43B 3/34 362/570 |
| 2009/0278449 A1 | 11/2009 | Choi et al. |
| 2010/0032660 A1 | 2/2010 | Nomoto et al. |
| 2010/0063778 A1 | 3/2010 | Schrock et al. |
| 2010/0170115 A1 | 7/2010 | Smith, III |
| 2010/0289971 A1 | 11/2010 | Odland et al. |
| 2011/0032105 A1 | 2/2011 | Hoffman et al. |
| 2011/0192053 A1 | 8/2011 | Beers |
| 2011/0199393 A1 | 8/2011 | Nurse et al. |
| 2011/0271558 A1 | 11/2011 | Rosko et al. |
| 2012/0066936 A1 | 3/2012 | Shepherd |
| 2012/0078396 A1 | 3/2012 | Case, Jr. et al. |
| 2012/0188750 A1 | 7/2012 | Marston |
| 2012/0192462 A1 | 8/2012 | Hsu |
| 2012/0234111 A1 | 9/2012 | Molyneux et al. |
| 2012/0251079 A1 | 10/2012 | Meschter et al. |
| 2012/0260532 A1 | 10/2012 | Catalano |
| 2012/0291563 A1 | 11/2012 | Schrock et al. |
| 2012/0291564 A1 | 11/2012 | Amos et al. |
| 2012/0324764 A1 | 12/2012 | Velez-Cruz |
| 2013/0212911 A1 | 8/2013 | Song |
| 2013/0213144 A1 | 8/2013 | Rice et al. |
| 2013/0213147 A1* | 8/2013 | Rice ................ G01L 1/205 73/862.046 |
| 2013/0219754 A1 | 8/2013 | Nowak et al. |
| 2013/0239441 A1 | 9/2013 | Chen |
| 2013/0247422 A1 | 9/2013 | Holt et al. |
| 2014/0139353 A1 | 5/2014 | Wojcieszak et al. |
| 2014/0144050 A1 | 5/2014 | Smith, III |
| 2014/0173942 A1 | 6/2014 | Gou |
| 2014/0247581 A1 | 9/2014 | Chou |
| 2014/0250610 A1 | 9/2014 | Schoborg |
| 2014/0250720 A1 | 9/2014 | Miner et al. |
| 2014/0250735 A1 | 9/2014 | Schoborg |
| 2016/0198788 A1* | 7/2016 | Larsen ................ A43B 3/36 362/103 |
| 2016/0242490 A1 | 8/2016 | Sander et al. |
| 2016/0247379 A1 | 8/2016 | Forbes |
| 2016/0338441 A1 | 11/2016 | London |
| 2016/0374171 A1 | 12/2016 | Wilken et al. |

FOREIGN PATENT DOCUMENTS

| | | |
|---|---|---|
| CN | 2792245 Y | 7/2006 |
| CN | 201019029 Y | 2/2008 |
| CN | 101932260 A | 12/2010 |
| CN | 202005291 U | 10/2011 |
| CN | 104544706 A | 4/2015 |

(56) References Cited

FOREIGN PATENT DOCUMENTS

| | | |
|---|---|---|
| EP | 0534560 A1 | 3/1993 |
| WO | WO-2007139979 A2 | 12/2007 |
| WO | WO-2014081706 A2 | 5/2014 |

OTHER PUBLICATIONS

China National Intellectual Property Administration, Notification of First Office Action for CN Application No. 201680044160.3, dated Feb. 1, 2019.
International Search Report and Written Opinion for Application No. PCT/US2016/036391, dated Aug. 26, 2016, 12 pages.
United States Patent and Trademark Office, Office Action for U.S. Appl. No. 14/744,162, dated Feb. 1, 2017.
United States Patent and Trademark Office, Office Action for U.S. Appl. No. 14/744,162, dated Jun. 21, 2017.
United States Patent and Trademark Office, Office Action for U.S. Appl. No. 14/744,162, dated Dec. 6, 2017.
United States Patent and Trademark Office, Office Action for U.S. Appl. No. 14/744,162, dated Jun. 15, 2018.
China National Intellectual Property Administration, Notification of Second Office Action and Search Report for CN Application No. 201680044160.3, dated Sep. 4, 2019.
China National Intellectual Property Administration (P.R.C.), First Office Action for CN Application No. 201680044184.9, dated Dec. 27, 2019.
China National Intellectual Property Administration, Office Action for CN Application No. 201680044160.3, dated May 21, 2020.

\* cited by examiner

METHOD OF ILLUMINATING AN ARTICLE

CROSS-REFERENCE TO RELATED APPLICATIONS

This application is a continuation of U.S. patent application Ser. No. 16/382,556, filed Apr. 12, 2019, which is a continuation of U.S. patent application Ser. No. 14/744,180, filed Jun. 19, 2015, which is related to co-pending U.S. patent application Ser. No. 14/744,162, filed Jun. 19, 2015, titled "Article Incorporating an Illumination Device", the disclosures of which are hereby incorporated by reference in their entirety.

BACKGROUND

The present embodiments relate generally to articles of apparel, and in particular to articles of footwear with an illumination device.

Articles of footwear generally include two primary elements, an upper and a sole system. The upper may be formed from a variety of material elements (e.g., textiles, polymer sheets, foam layers, leather, synthetic leather) that are stitched or bonded together to form a void for comfortably and securely receiving a foot. More particularly, the upper generally extends over the instep and toe areas of the foot, along the medial and lateral sides of the foot, under the foot, and around the heel area of the foot. In some articles of footwear, such as basketball shoes and boots, the upper may extend upward and around the ankle to provide support or protection for the ankle. Access to the void within the upper is generally provided by an ankle opening in a heel region of the footwear. A lacing system is often incorporated into the upper to adjust the fit of the upper, as well as permitting entry and removal of the foot from the void within the upper. In addition, the upper may include a tongue that extends under the lacing system to enhance adjustability and comfort of the footwear.

The sole system is secured to a lower portion of the upper and is generally positioned between the foot and the ground. In some articles of footwear, including athletic footwear, the sole system incorporates a sockliner, a midsole, and an outsole. The sockliner is a thin, compressible member located within the void (i.e., under the foot) to enhance footwear comfort. The midsole extends downward from the upper and forms a middle layer of the sole system. In addition to attenuating ground reaction forces (i.e., providing cushioning for the foot), the midsole may limit foot motions or impart stability, for example. Although the midsole of athletic footwear may be primarily formed from a foamed polymer material, the midsole may include a variety of additional footwear elements that enhance the comfort or performance of the footwear, including plates, moderators, fluid-filled chambers, lasting elements, or motion control members. The outsole is secured to a lower surface of the midsole and forms a ground-contacting portion of the footwear. Additionally, the outsole may be formed from a durable and wear-resistant material that includes texturing to improve traction.

BRIEF DESCRIPTION OF DRAWINGS

The embodiments can be better understood with reference to the following drawings and descriptions. The components in the figures are not necessarily to scale, emphasis instead being placed upon illustrating the principles of the embodiments. Moreover, in the figures, like reference numerals designate corresponding parts throughout the different views.

DETAILED DESCRIPTION OF DRAWINGS

Figure 1:
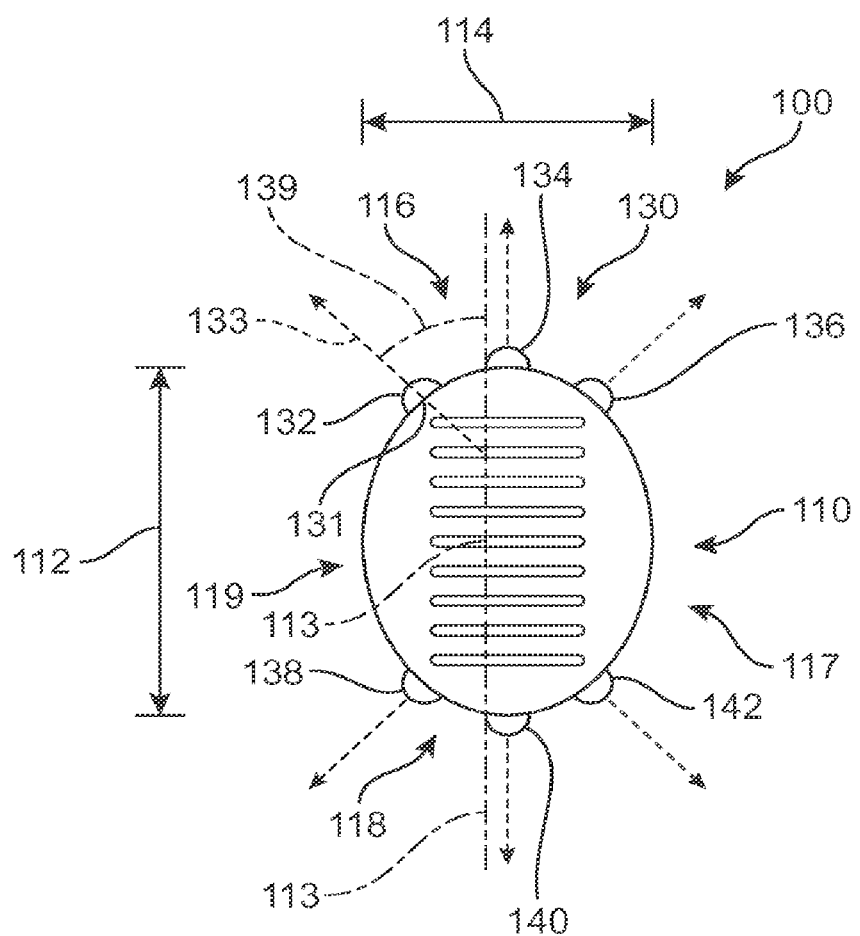
FIG. 1 is schematic top view of an embodiment of an illumination device.

In one aspect, the invention provides for a method of operation for an illumination device, comprising the steps of: receiving input of a user-selected condition-responsive parameter. Retrieving a threshold value related to the user-selected condition-responsive parameter. Retrieving information related to a present value of the user-selected condition-responsive parameter from a sensor disposed on the illumination device. Wherein the illumination device operates in a first illumination mode when the present value is less than the threshold value. Wherein the illumination device operates in a second illumination mode when the present value is greater than or equal to the threshold value. Wherein the first illumination mode and the second illumination mode are different.

In another aspect, the invention provides for a method operation for an illumination device, disposed internally to a sole system, for illuminating regions of a sole system for an article of footwear. The method comprising the steps of receiving input of a user-selected condition-responsive parameter. Retrieving a threshold value related to the user-selected condition-responsive parameter. Retrieving information related to a present value for the user-selected condition-responsive parameter from a sensor disposed on the illumination device. Wherein the illumination device illuminates a first region of the sole system in a predetermined first illumination mode when the present value is less than the threshold value. Wherein the illumination device illuminates a second region of the sole system in a predetermined second illumination mode when the present value is greater than or equal to the threshold value. Wherein the first region is different than the second region.

In another aspect, the invention provides for a method of operation for an illumination device, disposed internally to a sole system, for illuminating regions of a sole system for an article of footwear. The method comprising the steps of the illumination device receiving input of a user-selected condition-responsive parameter. Retrieving a present value for the user-selected condition-responsive parameter. Receiving input of a user-selected first illumination mode. Receiving input of a user-selected second illumination mode. Retrieving information related to the user-selected condition-responsive parameter from a sensor disposed on the illumination device. Wherein the illumination device illuminates the sole system in the user-selected first illumination mode when the present value is less than the threshold value. Wherein the illumination device illuminates the sole system in the user-selected second illumination mode when the present value is greater than or equal to the threshold value. Wherein the user-selected first illumination mode and the user-selected second illumination mode are different.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

FIG. 1 illustrates a schematic top view of an exemplary illumination device 100. The term "illumination device" as used throughout this detailed description and in the claims refers to any device capable of emitting light in one or more colors. Further, "illumination device" as used throughout this detailed description and in the claims may refer to any device capable of emitting light in one or more colors in a desired location with a desired illumination effect.

In some embodiments, illumination device 100 may include a housing portion 110. In some cases, housing portion 110 may be constructed from any suitable material known in the art. In some other embodiments, housing portion 110 may include a forward or first portion 116, and a rearward or second portion 118. In other embodiments, housing portion 110 may include a right side portion 117, and a left side portion 119.

As indicated in FIG. 1, housing portion 110 may also be characterized by a thickness (not visible in FIG. 1) extending in a direction perpendicular to both a longitudinal length 112 and a lateral width 114. In at least some embodiments, the thickness of housing portion 110 may be substantively less than longitudinal length 112 and lateral width 114.

In some embodiments, housing portion 110 may include provisions for powering illumination device 100. In some other embodiments, housing portion 110 may include provisions for providing light to illumination device 100. In still some other embodiments, housing portion 110 may include provisions for programming illumination device 100. In some embodiments, housing portion 110 may include provisions for powering, providing light, and/or programming illumination device 100. Each of these provisions shall be discussed in detail below.

In some embodiments, housing portion 110 may include a power supply 120 (see FIG. 2) for powering illumination device 100. In some cases, illumination device 100 can be turned on and off by pressing down on housing portion 110. In some cases, power supply 120 may be any device capable of storing power for illumination device 100. In some embodiments, power supply 120 may be any oscillating electrical potential source, including but not limited to, an alternating current source, a direct current to alternating converter output (i.e., the output of a battery and an inverter), or an electric oscillator (i.e., a sine wave generator, square wave generator, or a tuned LC oscillator). In one embodiment, power supply 120 may be a battery such as a rechargeable polymer lithium-ion battery having an output of 240 milliampere hours. In some embodiments, power supply 120 may be a disposable battery. Examples of different types of disposable batteries include, but are not limited to: zinc-carbon, zinc-chloride, alkaline, silver-oxide, lithium disulfide, lithium-thionyl chloride, mercury, zinc-air, thermal, water-activated, nickel oxhydroxide, and paper batteries. In another embodiment, power supply 120 could be a rechargeable battery of some kind. Examples of rechargeable batteries include, but are not limited to nickel-cadmium, nickel-metal hydride and rechargeable alkaline batteries. In still other embodiments, power supply 120 could be another type of device capable of generating and storing electricity. For example, in one embodiment, power supply 120 could be a piezoelectric device capable of generating and storing electricity.

In some embodiments, housing portion 110 may include provisions for producing light from illumination device 100. In some cases, these provisions may be in the form of one or more illuminable elements 130. For purposes of clarity, illuminable elements 130, and its variants thereof, may refer to any elements capable of emitting different types of light. For example, in some embodiments, illuminable elements 130 may be capable of emitting electroluminescent light. However, it is to be understood that illuminable elements 130 are not limited to any specific type of light emitting technology.

In some embodiments, illuminable elements 130 may be in the form of light emitting diodes (LEDs). In an exemplary embodiment, illumination device 100 may use red, green, and blue (RGB) LEDs to disperse light in one or more colors.

As shown in FIG. 1, illumination device 100 may comprise of three LEDs in the first portion 116, and three LEDs in the second portion 118. For example, LEDs in the first portion 116 of illumination device 100 may comprise of first LED 132, second LED 134, and third LED 136 oriented horizontally from the left side to the right side. LEDs in the second portion 118 of illumination device 100 may comprise of fourth LED 138, fifth LED 140, and sixth LED 142 oriented horizontally from the left side to the right side.

In some embodiments, illuminable elements 130 may be disposed in housing portion 110 so that the propagation of light is directed at an angle relative to a horizontal or vertical direction. As used herein, the orientation of an illuminable element is defined by a normal axis that generally extends outwardly from a base of the illuminable element (e.g., from the surface where the illuminable element attaches to housing portion 110). Thus, for example, first LED 132 has an orientation 133 characterized by an axis (or ray) that is directed normally from a base portion 131 of first LED 132.

In some embodiments, the orientation of an illuminable element may be characterized relative to longitudinal length 112 or lateral width 114 of illumination device 100. As shown in FIG. 1, first LED 132, third LED 136, fourth LED 138, and sixth LED 142 may be angled with respect to, or oriented away from, a longitudinal direction (indicated schematically by longitudinal axis 113) that extends along length 112 of housing portion 110. For example, orientation 133 of first LED 132 forms a non-zero angle 139 with longitudinal axis 113. Likewise, each of third LED 136, fourth LED 138 and sixth LED 142 are oriented at non-zero angles with longitudinal axis 113. More specifically, first LED 132 is oriented towards a forward-left direction, third LED 126 is oriented towards a forward-right direction, fourth LED 138 is oriented towards a rearward-left direction and sixth LED 142 is oriented towards a rearward-right direction. Further, second LED 134 is oriented in a forward direction, while fifth LED 140 is oriented in a rearward direction.

Of course, light emitted from an illuminable element may be dispersed over a wide range of angles, and need not be emitted along a particular angular direction. However, the orientations of illuminable elements as defined above may still correspond with light emitted generally in some direction (e.g., forward, backwards, to the left or to the right). Further, in cases where illumination device 100 is disposed within an object (such as a bladder), the differently oriented illuminable elements may tend to light up different regions of the object, as discussed in further detail below.

Other configurations for illuminable elements on housing portion 110 are also possible. Specifically, the number and/or orientation of various illuminable elements can vary. In some other embodiments, only two LEDs may be present on first portion 116 and two LEDs may be present on second portion 118. Alternatively, in other embodiments, more than three LEDs can be disposed on first portion 116 and more than three LEDs can be disposed on second portion 118.

Still in some other embodiments, illumination device 100 may comprise of a large illuminable element in the first portion 116, and/or a large illuminable element in the second portion 118. Further in some embodiments, illuminable elements 130 may be disposed on the right side portion 117 and/or the left side portion 119. Further still in some other embodiments, illuminable elements 130 may be oriented vertically, in other words, the thickness of the illumination device 100 may be able to accommodate illuminable elements 130 oriented from the bottom surface to the top surface of illumination device 100. Further still, the thickness may be able to accommodate a plurality of rows of illuminable elements 130 oriented both vertically and horizontally. The number of illuminable elements, their relative sizes, placement and/or their respective orientations may be selected according to desired lighting effects, manufacturing considerations, component geometry (e.g., housing geometry and/or bladder geometry) as well as possibly other factors.

In another embodiment, illuminable elements 130 can be associated with one or more of organic thin film transistor technologies, organic light emitting diode (OLED) technologies, flexible OLED technologies, as well as other electroluminescent elements. Examples are disclosed in any of the following: U.S. Patent Application Publication Number 2010/10032660, U.S. Patent Application Publication Number 2009/0278449, U.S. Patent Application Publication Number 2007/0222370, U.S. Pat. Nos. 7,075,226, and 6,969,291, the entirety of each being hereby incorporated by reference in its entirety.

In some embodiments, a width of the light emanating from illuminable elements 130, also known as beam angle, may vary. For purposes of clarity, beam angle and its variants thereof, may refer to the angular size of a beam of light emitted from one or more illuminable elements 130. For purposes of clarity, the exemplary embodiment discusses a beam angle as confined generally to the horizontal direction, however a beam angle could alternatively be characterized as a solid angle when the vertical dispersion of light is also considered. For example, in some embodiments, the beam angle may be very narrow, between 7 and 15 degrees. In some other embodiments, the beam angle may be very wide, between 60 and 160 degrees. Still further, the beam angle could range between 160 degrees to 300 degrees. In some cases, the beam angle could be close to 360 degrees. A wide beam angle may flood an area with illumination, whereas a very narrow beam angle may propagate a collimated beam or spot of light with minimal dispersion at a specific location. The type of Illuminable elements 130 utilized by those skilled in the art for illumination device 100 may vary depending on the type of beam angle desired.

In some cases, illumination device 100 may be capable of projecting light at a specific location or illumination zone using one illuminable element 130, or at several locations using a plurality of illuminable elements 130. For example the first portion 116 may be illuminated by illuminating first LED 132, second LED 134, and third LED 136. Still in some other embodiments, illumination device 100 may be capable of dispersing light from the right side portion 117 for example by illuminating only third LED 136 and sixth LED 142, or the left side portion 119 by illuminating only first LED 132 and fourth LED 138.

Housing portion 110 may include provisions for programming illumination device 100 to emit light in a variety of illumination modes which are different from each other. As used in this detailed description and in the claims, illumination mode and its variants thereof may refer to dispersing light based on an output light color or based on various illumination effects, discussed in further detail below. Furthermore, illumination mode may also refer to illuminating different illumination locations, zones or regions by emitting light from one or more illuminable elements 130. Further it is to be understood that illumination mode may refer to emitting light from illumination device 100 using a combination of light color, illumination effects, and/or illumination zones. For purposes of clarity, light color, and its variants thereof, may refer to one or more colors of light emitted by one or more illuminable elements 130. Therefore, as used in this detailed description and in the claims, illumination modes may be different as light may be dispersed based on an illumination effect, or based on illuminating a region, or based on a combination of light color, illumination effects, and or illuminating regions.

In some cases, because illumination device 100 can emit light with a very wide beam angle or narrow beam angle depending on the type of illuminable elements 130 used, illumination device 100 can be programmed with functionalities to disperse light at specific different locations (i.e., illumination zones) sequentially. In some other embodiments, illumination device 100 may be capable of dispersing light based on various condition-responsive parameters including, but not limited to, motion, ambient light conditions, or biological data such as a heartbeat. In an exemplary embodiment, provisions located within housing portion 110 may include a circuit (e.g., a circuit board) having a control unit and sensors for programming illumination device 100 with different functionalities.

Figure 2:
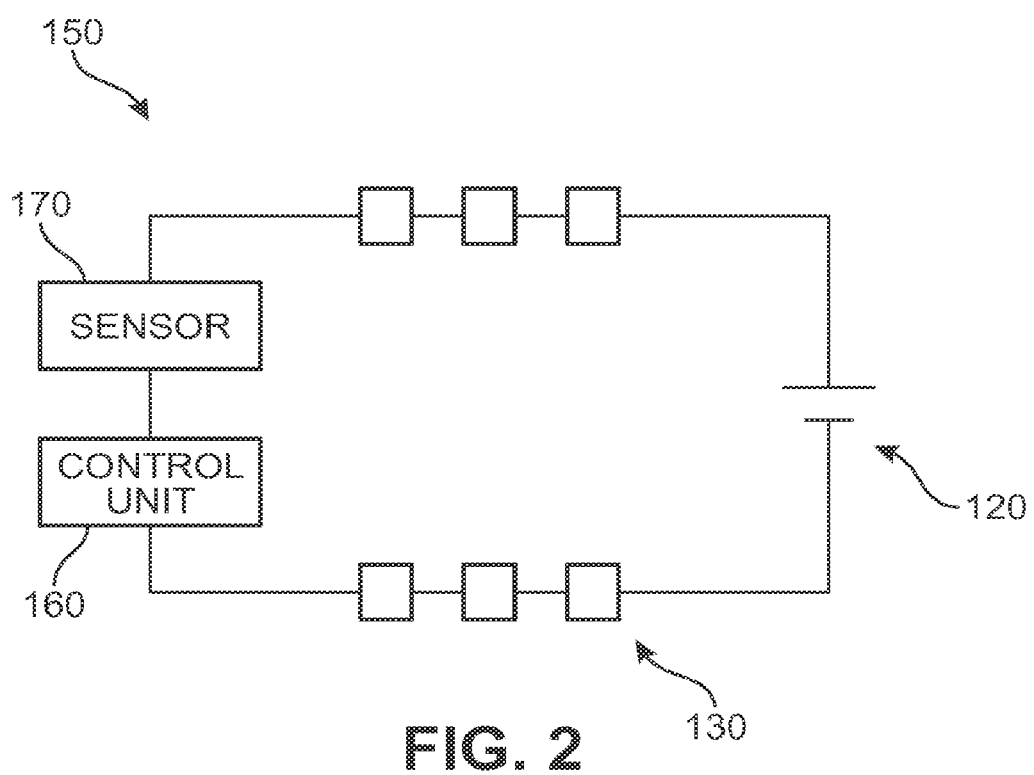
FIG. 2 is schematic diagram of an embodiment of an electronic circuit of an illumination device.

FIG. 2 illustrates a schematic diagram of an example of circuit 150 with power supply 120, control unit 160, sensors 170, and illuminable elements 130. In some embodiments, control unit 160 and sensors 170 can be programmed to receive, transmit, and store data relating to when illuminable elements 130 are engaged, for example, emitting light in a certain illumination effect. In another example, control unit 160 may be programmed to emit light based on movement detected by sensors 170. In another embodiment, control unit 160 may be programmed to emit several colors of light in combination with different illumination effects, and responsive conditions received by sensors 170.

Other inputs from sensors may be used to influence the performance or operation of the system. Some embodiments may use one or more of the sensors, features, methods, systems and/or components disclosed in the following documents, each of which is hereby incorporated by reference in their entirety: Case et al., U.S. Pat. No. 8,112,251, issued Feb. 7, 2012; Riley et al., U.S. Pat. No. 7,771,320, issued Aug. 10, 2010; Darley et al., U.S. Pat. No. 7,428,471, issued Sep. 23, 2008; Amos et al., U.S. Patent Application Publication Number 2012/0291564, published Nov. 22, 2012; Schrock et al., U.S. Patent Application Publication Number 2012/0291563, published Nov. 22, 2012; Meschter et al., U.S. Patent Application Publication Number 2012/0251079, published Oct. 4, 2012; Molyneux et al., U.S. Patent Application Publication Number 2012/0234111, published Sep. 20, 2012; Case et al., U.S. Patent Application Publication Number 2012/0078396, published Mar. 29, 2012; Nurse et al., U.S. Patent Application Publication Number 2011/0199393, published Aug. 18, 2011; Hoffman et al., U.S. Patent Application Publication Number 2011/0032105, published Feb. 10, 2011; Schrock et al., U.S. Patent Application Publication Number 2010/0063778, published Mar. 11, 2010; Shum, U.S. Patent Application Publication Number 2007/0021269, published Jan. 25, 2007; Schrock et al., U.S. Patent Application Publication Number 2013/0213147, now U.S. patent application Ser. No. 13/401,918, filed Feb. 22, 2012, titled "Footwear Having Sensor System"; Schrock et al., U.S. Patent Application Publication Number 2013/0213144, now U.S. patent application Ser. No. 13/401,910, filed Feb. 22, 2012, titled "Footwear Having Sensor System."

In some cases, illumination device 100 may disperse light based on a desired temporal interval, or illumination effect. Examples of various illumination effects include, but are not limited to: point effect, blink effect, fade effect, flicker effect, flash effect, or pulse effect. For purposes of clarity, "point" illumination effect may refer to light emitting in equal brightness in all directions. "Blink" illumination effect may refer to an emission of light that alternates on and off. "Fade" illumination effect or dimming effect may refer to an emission of light that fades from full brightness to dark, or dark to full brightness. "Flicker" illumination effect may refer to an emission of light that switches off for a brief period at random intervals. "Flash" illumination effect may refer to an emission of light that switches on for a brief period at random intervals. "Pulse" illumination effect may refer to an emission of light that fades in and out at regular or a steady state interval.

The following discussion and accompanying figures disclose various configurations of an article of footwear that incorporates illumination device 100. Concepts related to illumination device 100 are disclosed with reference to footwear that is suitable for running or walking. However, illumination device 100 is not limited to articles of footwear designed for these activities alone, nor is illumination device 100 limited to articles of footwear in general. The concepts disclosed herein may, therefore, apply to a wide variety of articles of apparel, in addition to the specific styles discussed in the following material and depicted in the accompanying figures.

Figure 3:
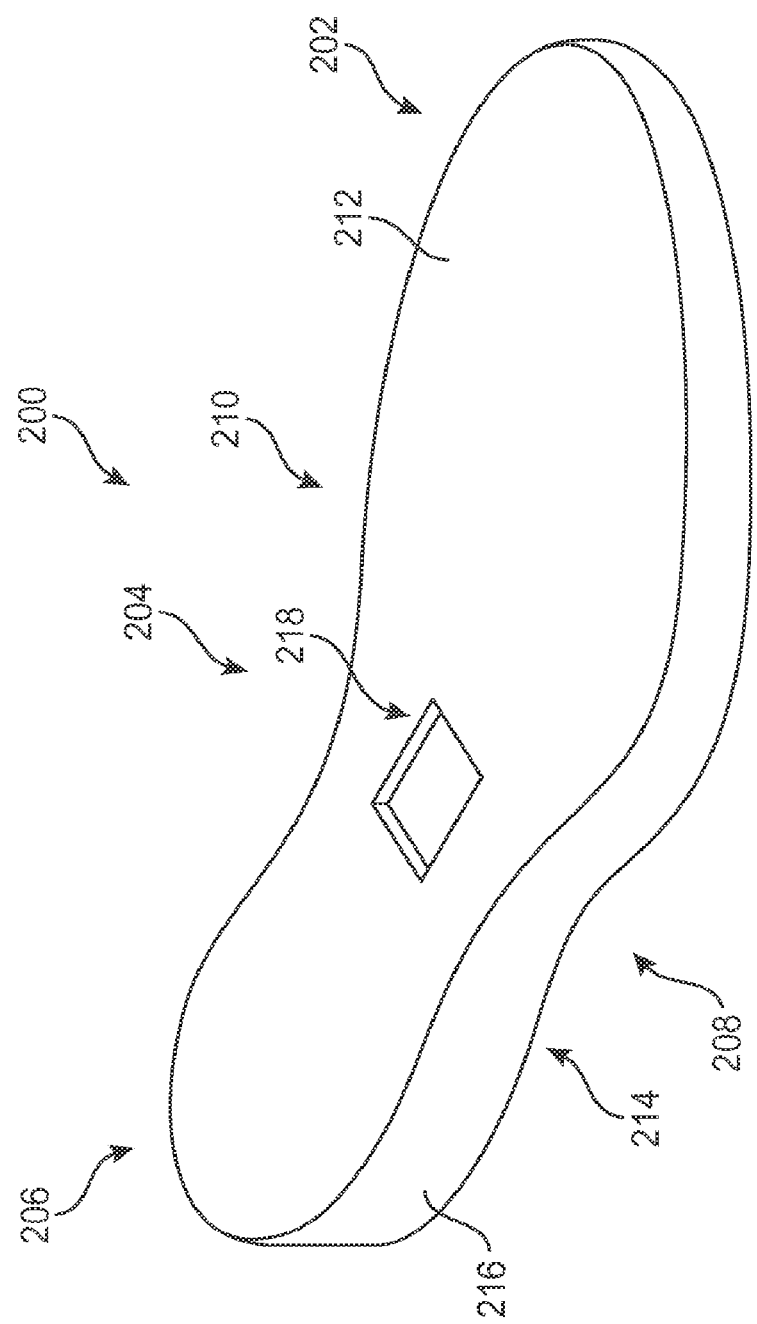
FIG. 3 is schematic isometric view of an embodiment of a bladder member.
Figure 4:
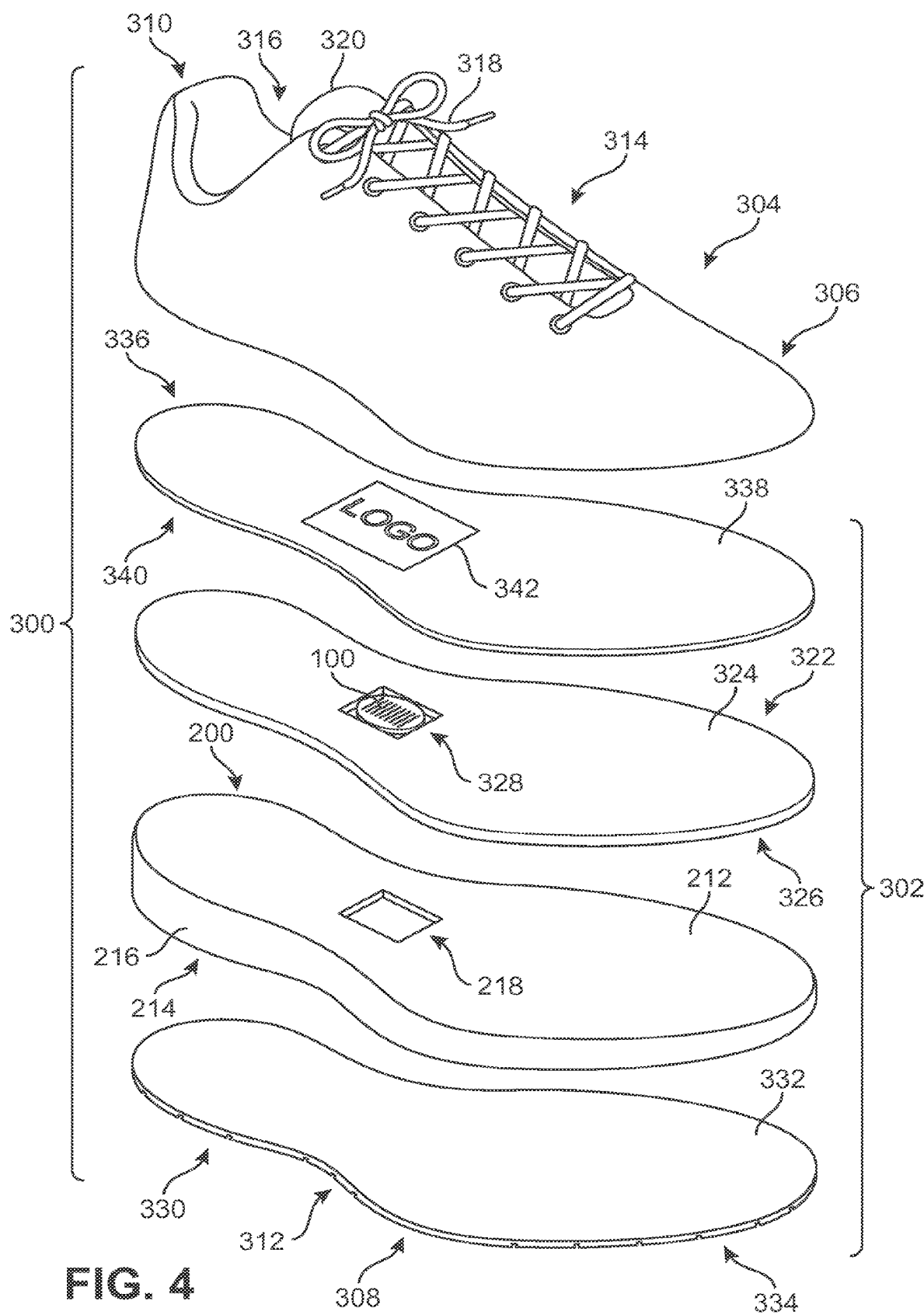
FIG. 4 is an exploded perspective view of an embodiment of an article of footwear.

FIGS. 3 and 4 illustrate schematic isometric and exploded views of an embodiment of bladder member (bladder) 200 for article of footwear 300 and sole system 302. For purposes of illustration, FIG. 3 shows bladder member 200 in isolation from other components of an article of footwear 300. However, it will be understood that bladder member 200 may be utilized in various different kinds of footwear including, but not limited to: hiking boots, soccer shoes, football shoes, sneakers, running shoes, cross-training shoes, rugby shoes, basketball shoes, baseball shoes as well as other kinds of shoes. Moreover, in some embodiments, bladder member 200 may be configured for use with various kinds of non-sports related footwear, including, but not limited to: slippers, sandals, high-heeled footwear, loafers, as well as other kinds of footwear.

Referring to FIG. 3, for purpose of reference, bladder member 200 may be divided into forefoot portion 202, midfoot portion 204, and heel portion 206. As shown, bladder member 200 may be associated with the right foot; however, it should be understood that the following discussion may equally apply to a mirror image of bladder member 200 that is intended for use with a left foot. Forefoot portion 202 may be generally associated with the toes and joints connecting the metatarsals with the phalanges. Midfoot portion 204 may be generally associated with the arch of a foot. Likewise, heel portion 206 may be generally associated with the heel of a foot, including the calcaneus bone. In addition, bladder member 200 may include lateral side 208 and medial side 210. In particular, lateral side 208 and medial side 210 may be opposing sides of bladder member 200. In general, lateral side 208 may be associated with the outside parts of a foot while medial side 210 may be associated with the inside part of a foot. Furthermore, lateral side 208 and medial side 210 may extend through forefoot portion 202, midfoot portion 204, and heel portion 206.

It will be understood that forefoot portion 202, midfoot portion 204, and heel portion 206 are only intended for purposes of description and are not intended to demarcate precise regions of bladder member 200. Likewise, lateral side 208 and medial side 210 are intended to represent generally two sides rather than precisely demarcating bladder member 200 into two halves.

In some embodiments, bladder member 200 may comprise of an upper or first surface 212, an opposite lower or second surface 214 and a peripheral or third surface 216. In some embodiments, these surfaces may be joined to form and enclose an interior cavity. In some embodiments, the interior cavity may be filled with a fluid, including a liquid, or gas. First surface 212, second surface 214, and third surface 216 may be substantially impermeable to the fluid. In an exemplary embodiment, the interior cavity may be filled with air. With this exemplary embodiment, bladder member 200 may act as a cushioning element to increase the comfort, flexibility, and support of a sole system.

In some embodiments, bladder member 200 may Include provisions for accommodating illumination device 100. In some cases, bladder member 200 may comprise of a void 218 that is dimensioned and shaped to accept the shape of illumination device 100. An exemplary embodiment configured this way may enable illumination device 100 to disperse light throughout the bladder member 200 and sole system 302.

Referring to FIG. 4, in some embodiments, article of footwear (footwear) 300 may be configured with a sole system 302, and an upper 304. As shown, footwear 300 may be associated with the right foot; however, it should be understood that the following discussion may equally apply to a mirror image of footwear 300 that is intended for use with a left foot.

In general, illumination device 100 may be used to illuminate portions of footwear 300. In addition to imparting a unique aesthetic to footwear 300 and enhancing enjoyment of the wearer of footwear 300, illuminated portions of footwear 300 may increase the visibility of the wearer, thereby making the wearer more visible to others in low light or darkened conditions. Further, illuminated portions of footwear 300 may make obstacles more visible to a wearer under these conditions. Illumination device 100 with its programmable functionalities and features may allow illuminated portions of footwear 300 to enhance the visibility of areas of footwear 300 that are subject to tensile, compression, bending, or twisting forces. Moreover, illuminating areas of footwear 300 may improve the degree to which the areas of footwear 300 are visible on high-speed film or other mediums that visually capture performance data during biomechanical or other forms of testing.

Similar to the bladder member 200 descriptions above, footwear 300 may be divided into three general regions, a forefoot region 306, a midfoot region 308, and a heel region 310. Footwear 300 may also include a lateral side 312 and a medial side 314.

For consistency and convenience, directional adjective are employed throughout this detailed description corresponding to the illustrated embodiments. The term "longitudinal" as used throughout this detailed description and in the claims may refer to an axis extending a length of the footwear. In some cases, the longitudinal axis may extend from a forefoot region to a heel region of the article of footwear. Also, the term "lateral" as used throughout this detailed description and in the claims may refer to an axis extending along a width of the article of footwear. In other words, the lateral axis may extend between a lateral side and a medial side of the article of footwear. Furthermore, the term "vertical" as used throughout this detailed description and in the claims may refer to an axis generally perpendicular to a lateral and longitudinal axis. For example, in some cases where an article of footwear is planted flat on a ground surface, the vertical axis may extend from the ground surface in a direction upward or downward. In addition, the term "proximal" may refer to a portion of an article of footwear that is closer to portions of a foot, for example, when the article of footwear is worn. Similarly, the term "distal" may refer to a portion of an article of footwear that is further from a portion of a foot when the article of footwear is worn. It will be understood that each of these directional adjectives may be used in describing individual components of article of footwear, such as outsole member, midsole member, bladder member, as well as other components of an article of footwear.

In some embodiments, upper 304 may incorporate a plurality of material elements (e.g. textiles, polymer sheets, foam layers, leather, synthetic leather) that are stitched or bonded together to form an interior void for securely and comfortable receiving a foot. In some cases, the material elements may be selected to impart properties of durability, air-permeability, wear resistance, flexibility, and comfort, for example, to specific areas of upper 304. An ankle opening 316 in a heel region 310 provides access to the interior void. In addition, in some embodiments, upper 304 may include a lace 318 that is utilized in a conventional manner to modify the dimensions of the interior void, thereby securing the foot within the interior void and facilitating entry and removal of the foot from the interior void. Lace 318 may extend through apertures in the upper 304 and a tongue 320 of upper 304 may extend between the interior void and lace 318. Although upper 304 provides an example of a suitable configuration for footwear 300, a variety of other upper configurations may be utilized with footwear 300.

Some articles of footwear may have provisions to enhance the comfort or performance of an article of footwear. In some embodiments, a sole member or sole system may include different components including a sockliner, an insole, a midsole member, and an outsole member. In some other embodiments, one or more elements may be optional.

As seen in FIG. 4, some embodiments may have sole system 302 secured to upper 304 and extend between upper 304 and the ground. In some cases, sole system 302 may impart cushioning for the foot (i.e. attenuating ground reaction forces). In some other cases, sole system 302 may provide traction, impart stability, and limit various foot motions, such as pronation. In some other embodiments, sole system 302 may be assembled in a stacked configuration as shown. The following discusses some components of an exemplary embodiment of sole system 302.

In some embodiments, sole system 302 may include a midsole member 322. In some cases, midsole member 322 may include an upper midsole surface 324 oriented towards the upper 304 and a lower midsole surface 326, opposite the upper midsole surface 324, and oriented towards the ground. In some cases, midsole member 322 may be secured to a lower area of upper 304. In some cases, midsole member 322 may comprise of a chamber portion 328 for accepting illumination device 100. Chamber portion 328 may be dimensioned and configured to fit within void 218 of bladder member 200 when sole system 302 is assembled. In some embodiments, midsole member may be absent from sole system 302, therefore illumination device may be placed directly into void 218.

In some cases, midsole member 322 may be made of any material known in the art for making midsoles. In some other cases, midsole member 322 may be formed from various polymer foam materials (e.g. polyurethane or ethylvinylacetate foam) that extends through forefoot region 306, midfoot region 308, heel region 310, lateral side 312 and medial side 314. In some embodiments, material used for making midsole member 322 may be opaque. In an exemplary embodiment, midsole member 322 is constructed from a transparent material, thereby allowing light emitted from illumination device 100 to pass through midsole member 322 and into bladder member 200.

In some sole systems 302, an outsole member 330 may be present. In some embodiments, outsole member 330 may include an inner surface 332 oriented towards the bladder member 200. In some other embodiments, outsole member 330 may include an outer surface 334 oriented towards a ground surface. In some embodiments, outsole member 330 may be secured to a lower area of bladder member 200. In some other embodiment outsole member 330 may be formed from a textured durable and wear-resistant material, for example rubber, that forms the ground contacting portion when footwear 300 is in use. Still in some other embodiments, outsole member 330 could be made of any material known in the art for making outsoles.

In some embodiments, sole system 302 may include sockliner 336. In some cases, sockliner 336 may be located within a lower portion of the void in the upper 304. In some other embodiments, sockliner 336 may have an upper surface 338 positioned to contact a lower surface of the foot and an opposite lower surface 340 confronting upper midsole surface 324. In some other cases, sockliner 336 may be used to enhance the comfort of footwear 300.

Materials used for sockliner 336 could vary. In some embodiments, sockliner 336 could be made of any materials known in the art for use in making sockliners, including, but not limited to: rubbers, plastics, foams, textiles, as well as possibly other materials. In still some other cases, sockliner 336 could be made from opaque or transparent materials.

Some embodiments may include provisions for engaging illumination device 100 through sole system 302. In some embodiments, sole system 302 may use sockliner 336. In some cases, sockliner 336 may comprise of a logo portion 342 located above chamber portion 328 of midsole member 322. Logo portion 342 may be used to engage illumination device 100 located in chamber portion 328 of midsole member 322 by pressing down on logo portion 342 of sockliner 336, and thereby turning illumination device 100 on and off. In some other embodiments, illumination device 100 may automatically turn off or go into a low energy or dormant state after a certain period of time when not in use. In other words, in some embodiments a user may not have to manually engage illumination device 100 to turn illumination device 100 on and off.

In some cases, sole system 302 may include bladder member 200 previously discussed. In some embodiments, upper or first surface 212 may be adjacent to midsole member 322. In some other embodiments, lower or second surface 214 may be adjacent to an outsole member 330. In some other embodiments, peripheral or third surface 216 is disposed between first surface 212 and second surface 214.

In some embodiments, sole system 302 may comprise of a bladder member 200 made of any material or combination of materials. Materials that may be useful for forming one or more surfaces of a bladder member 200 can vary. In some cases, bladder member 200 may be made of a rigid to semi-rigid material. In other cases, bladder member 200 may be made of a substantially flexible material. In some other cases, bladder member 200 may be made of various materials in different embodiments. For example, bladder member 200 may be formed from at least partially or wholly transparent polymer material that encloses a fluid (e.g. gas, liquid, gel). Although the fluid within the bladder member 200 may be pressurized, the fluid may also be at a substantially ambient pressure. In some embodiments, when bladder member 200 is pressurized, bonds may be formed between opposite sides of bladder member 200 to prevent expansion and retain an intended shape of bladder member 200.

In some embodiments, a range of polymer materials may be utilized for bladder member 200, disclosed in the following references, each of which is hereby incorporated by reference in their entirety. Specifically a wide range of materials may be selected for first surface 212, second surface 214, and third surface 216. In selecting materials for bladder member 200, engineering properties of the material (e.g., tensile strength, stretch properties, fatigue characteristics, dynamic modulus, and loss tangent) as well as the ability of the material to prevent the diffusion of the fluid enclosed by bladder member 200 may be considered. When formed of thermoplastic urethane, for example, bladder member 200 may have a thickness of approximately 1.0 millimeter, but the thickness may range from 0.2 to 4.0 millimeters or more, for example. In addition to thermoplastic urethane, examples of polymer materials that may be suitable for bladder member 200 include polyurethane, polyester, polyester polyurethane, and polyether polyurethane. In some other embodiments, bladder member 200 may also be formed from a material that includes alternating layers of thermoplastic polyurethane and ethylene-vinyl alcohol copolymer, as disclosed in U.S. Pat. Nos. 5,713,141 and 5,952,065 to Mitchell, et al. A variation upon this material may also be utilized, wherein layers include ethylene-vinyl alcohol copolymer, thermoplastic polyurethane, and a regrind material of the ethylene-vinyl alcohol copolymer and thermoplastic polyurethane. In some cases, another suitable material for bladder member 200 is a flexible microlayer membrane that includes alternating layers of a gas barrier material and an elastomeric material, as disclosed in U.S. Pat. Nos. 6,082,025 and 6,127,026 to Bonk, et al. Additional suitable materials are disclosed in U.S. Pat. Nos. 4,183,156 and 4,219,945 to Rudy. Further suitable materials include thermoplastic films comprised of a crystalline material, as disclosed in U.S. Pat. Nos. 4,936,029 and 5,042,176 to Rudy, and polyurethane including a polyester polyol, as disclosed in U.S. Pat. Nos. 6,013,340; 6,203,868; and 6,321,465 to Bonk, et al.

In some embodiments, bladder member 200 may have a shape that fits within a perimeter of sole system 302 of footwear 300, extending from forefoot region 306, midfoot region 308, heel region 310, and between lateral side 312 and medial side 314. Therefore, in some cases, when the foot is located within the upper 304, bladder member 200 extends under substantially all of the foot. In some embodiments, while first surface 212 is positioned adjacent and secured to midsole member 322 or sockliner 336, and second surface 214 is positioned adjacent and secured to outsole member 330, peripheral or third surface 216 may be exposed to an exterior of footwear 300 in forefoot region 306, midfoot region 308, heel region 310, and on lateral side 312 and medial side 314. In another embodiment, bladder member 200 may have a shape that fits partially within sole system 302, for example, bladder member 200 may have a shape configured to fit only within the heel region 310 of footwear 300.

Some articles of footwear 300 may include provisions for illuminating sole system 302 having bladder member 200. In some other embodiments, where bladder member 200 is formed from a partially or wholly transparent material, and outsole member 330 is formed from at least a partially or wholly opaque material, light from illumination device 100 may be capable of passing into and out of bladder member 200 through exposed portions of peripheral or third surface 216. In some other embodiments, where outsole member 330, and/or midsole member 322 and/or sockliner 336 are constructed from at least a partially or wholly transparent material, light from illumination device 100 may be capable of passing through portions of first surface 212 and/or second surface 214.

Some sole systems include provisions for illuminating different portions, target areas, illumination zones, or regions of a sole system in an arrangement. In some embodiments, the sole system may emit light, from a programmed illumination device, at an illumination zone, for example the forefoot region of an article of footwear. In some cases, the sole system may emit light at a second illumination zone, for example the heel region. In some other embodiments, the sole system may emit light in an arrangement continuously through various illumination zones, in other words, light may originally be dispersed towards at least a first illumination zone, and then transition dispersing light towards other illumination zones.

Figure 5:
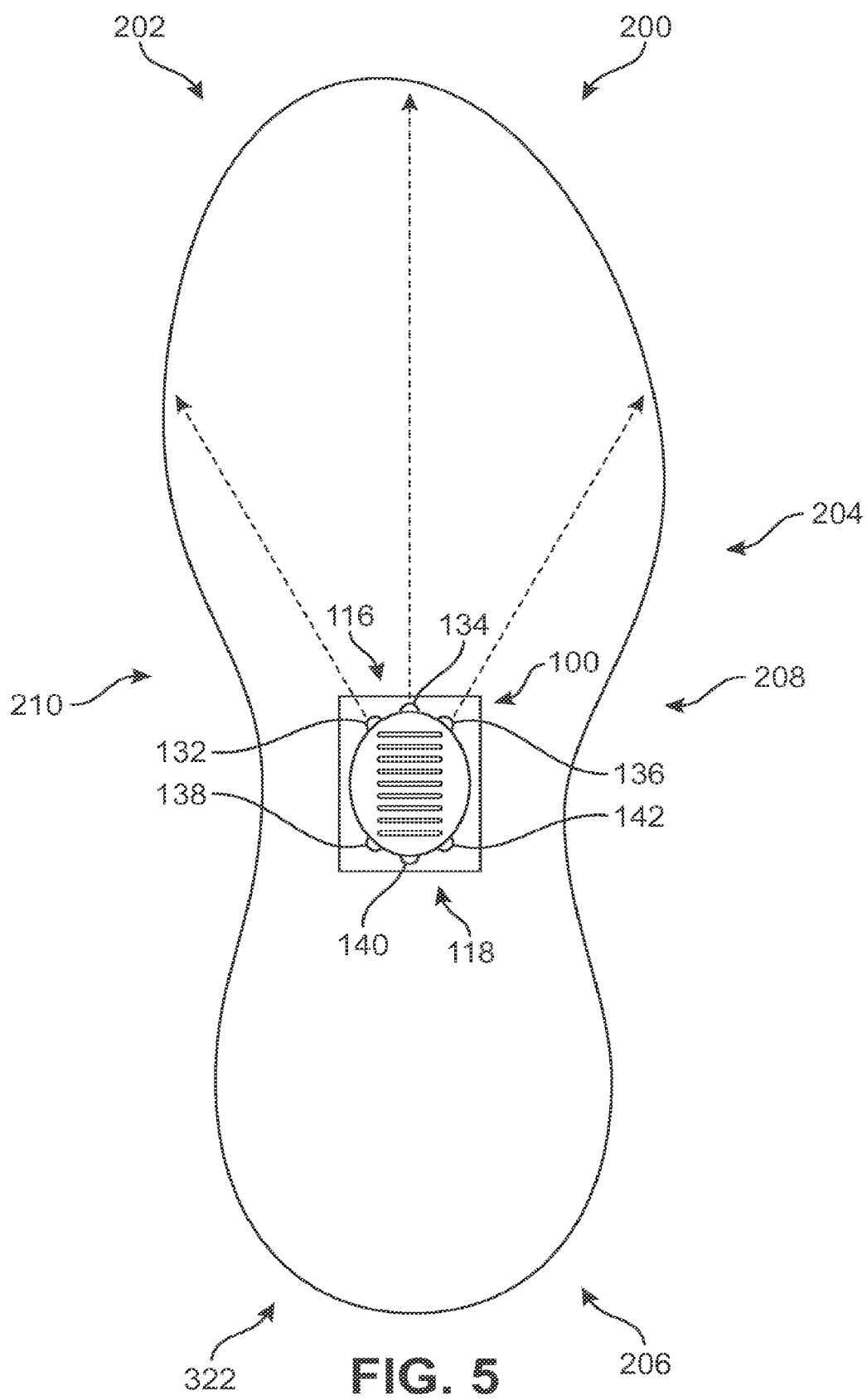
FIGS. 5-7 are schematic top views of an embodiment of a bladder member in different states of illumination.
Figure 6:
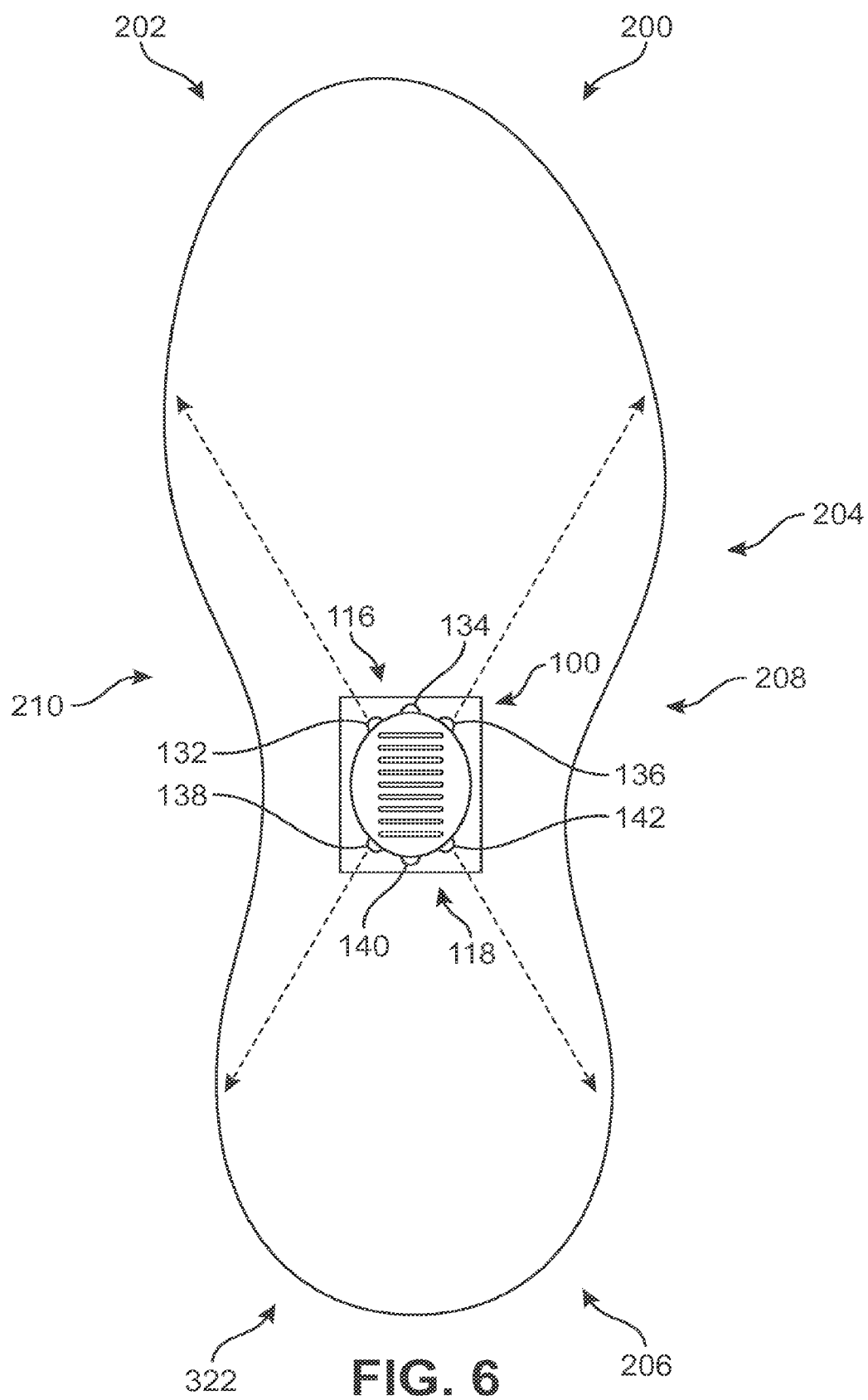
Figure 7:
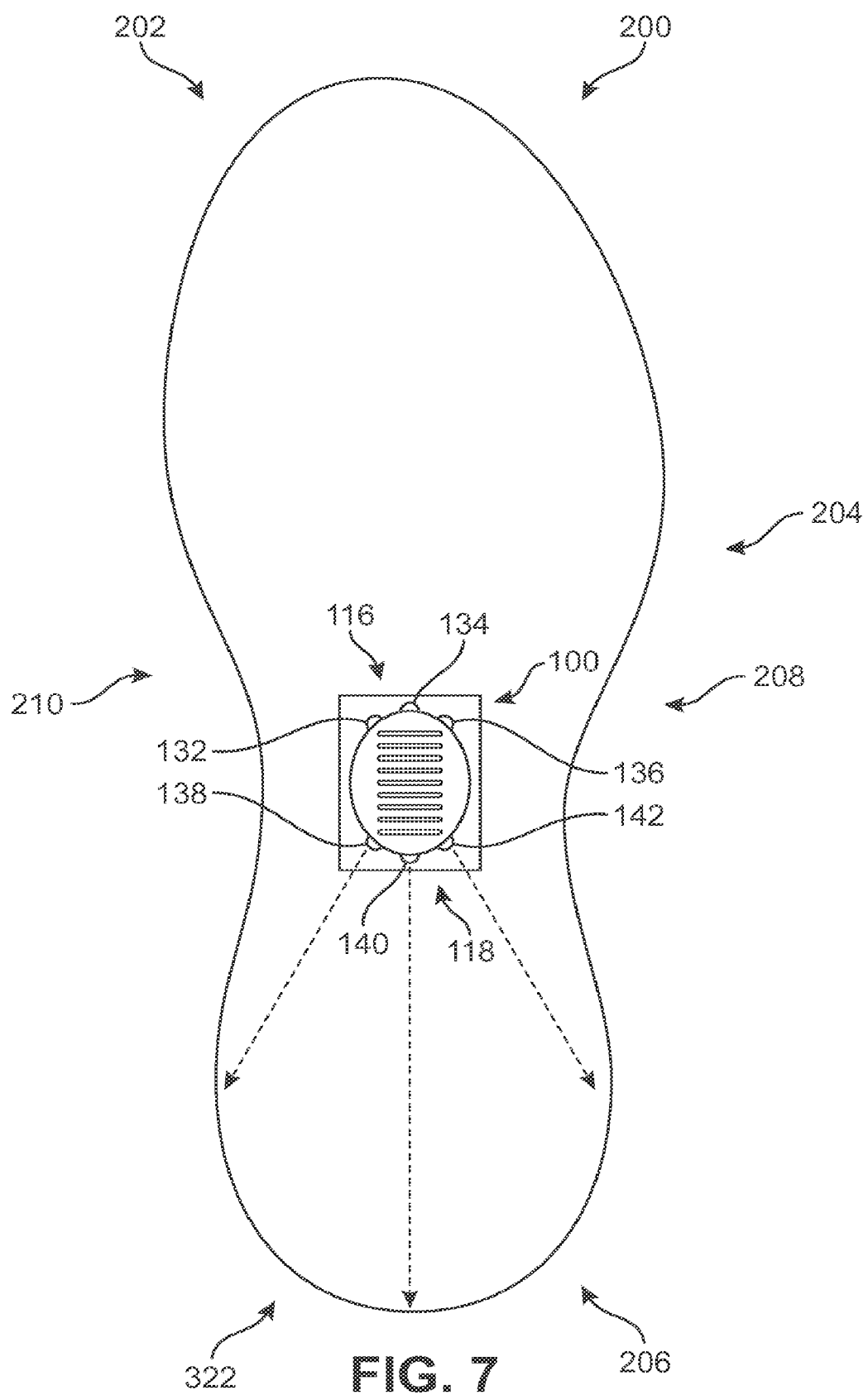

FIGS. 5 through 7 depict schematic top views of an exemplary transparent bladder member 200 for a sole system 302 with an illumination device 100 in a sequential illuminated state. For purposes of illustration, bladder member 200 and midsole member 322 are shown in isolation from other components of sole system 302 or footwear 300. Here, midsole member 322 is disposed over bladder member 200, with both members being transparent. Furthermore, the location of illumination device 100 in bladder member 200 and midsole member 322 in all the figures is meant to be illustrative, and not meant to show the exact location of illumination device 100 when sole system 302 and footwear 300 are assembled.

As shown in FIG. 5, light emitted from illumination device 100 passes longitudinally through the interior of bladder member 200, illuminating forefoot portion 202 and exiting bladder member 200 and sole system 302 that are exposed to an exterior of footwear 300. As previously discussed, illumination device 100 can disperse light at different locations continuously, depending on the orientation and type of illuminable elements 130 used by those skilled in the art. In an exemplary embodiment, illumination device 100 illuminates forefoot portion 202 by illuminating first LED 132, second LED 134, and third LED 136 and turning off fourth LED 138, fifth LED 140, and sixth LED 142.

In FIG. 6 after light has been projected towards the forefoot portion 202 of bladder, illumination device 100 may transition towards midfoot portion 204 by illuminating first LED 132, third LED 136, fourth LED 138, and sixth LED 142 and turning the remaining illuminable elements 130 off. Finally in FIG. 7, illumination device 100 illuminates heel portion 206 of bladder member 200 by illuminating fourth LED 138, fifth LED 140, and sixth LED 142 and turning the illuminable elements 130 in the first portion 116 off. In some embodiments, illumination device 100 can then start the sequence over again and begin emitting light towards forefoot portion 202. In some other embodiments, illumination device 100 can be programmed to reverse the sequence instead, in other words, it illuminates bladder member 200 starting from heel portion 206 and ending at forefoot portion 202.

In some embodiments, illumination device 100 can be programmed in combination with functionalities relating to movement. In other words, illumination device 100 can emit light continuously from one region to another region of sole system 302 corresponding to the movement of footwear 300 striking the ground surface. As an example, as a jogger's heel strikes the ground, illumination device 100 may emit light in the heel region 310 of footwear 300 and continuously emit light towards the jogger's toes or forefoot region 306 of footwear 300, as the jogger completes his or her step.

Figure 8:
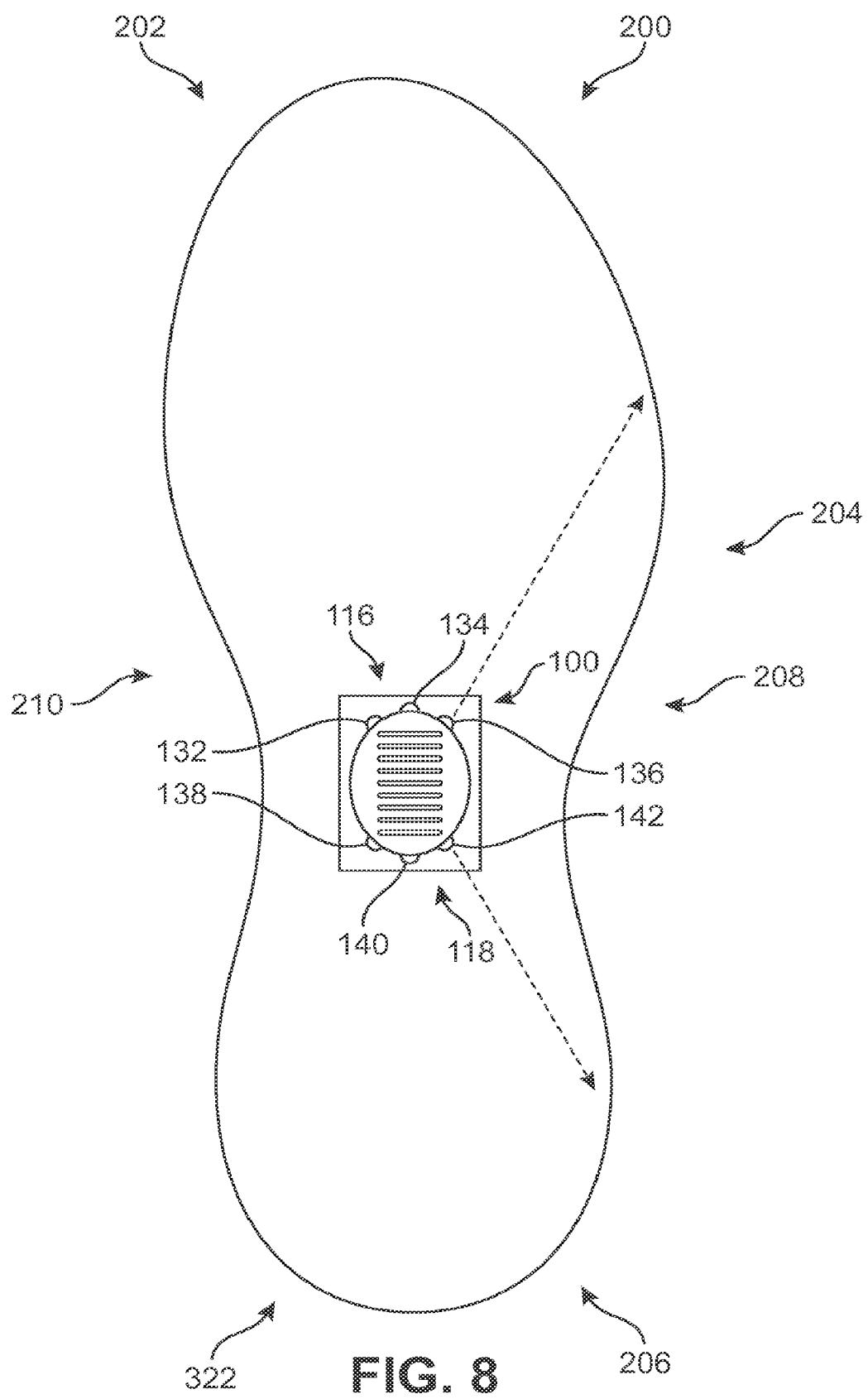
FIGS. 8-10 are schematic top views of an embodiment of an article of footwear showing the bladder member in different states of illumination.
Figure 9:
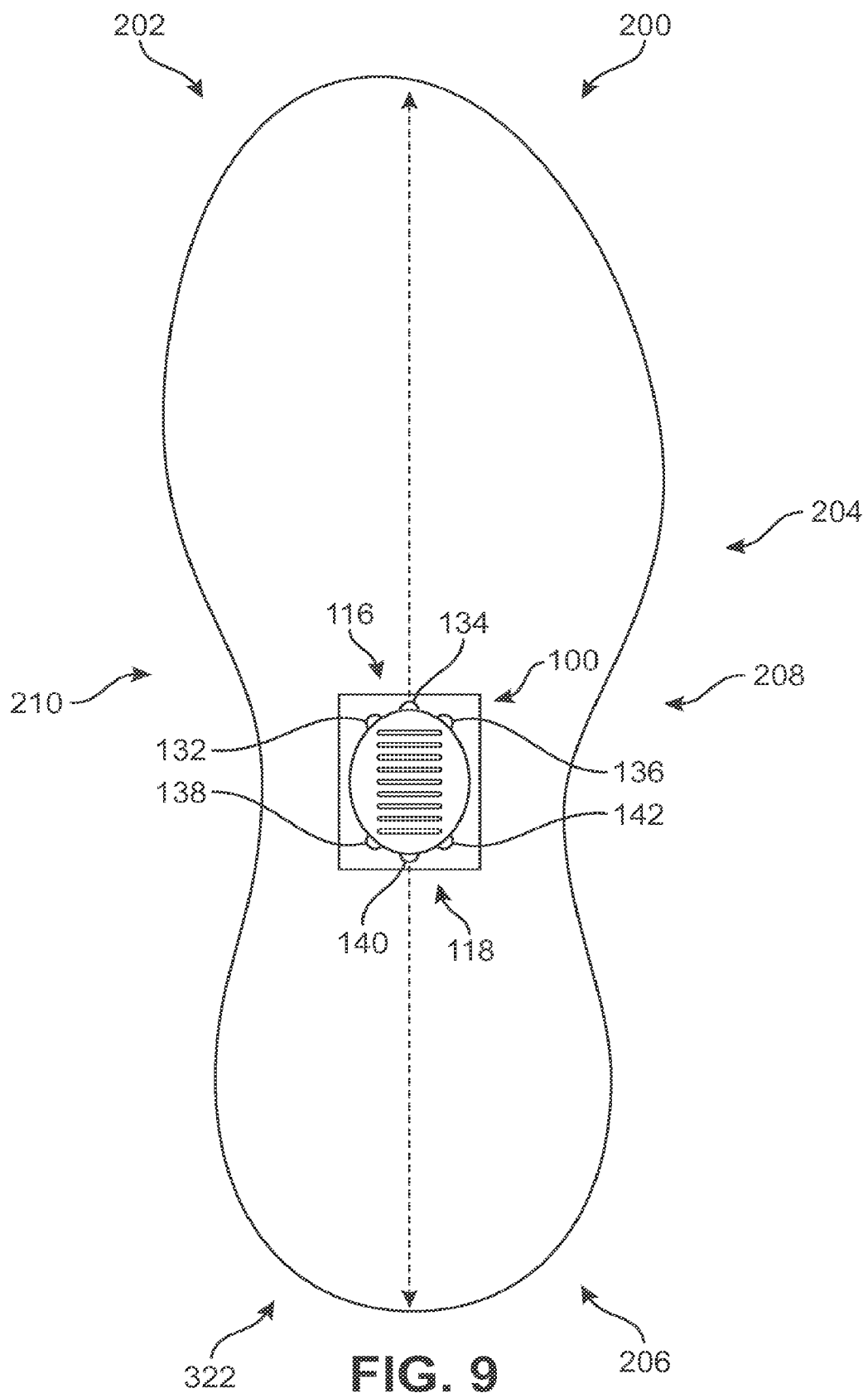
Figure 10:
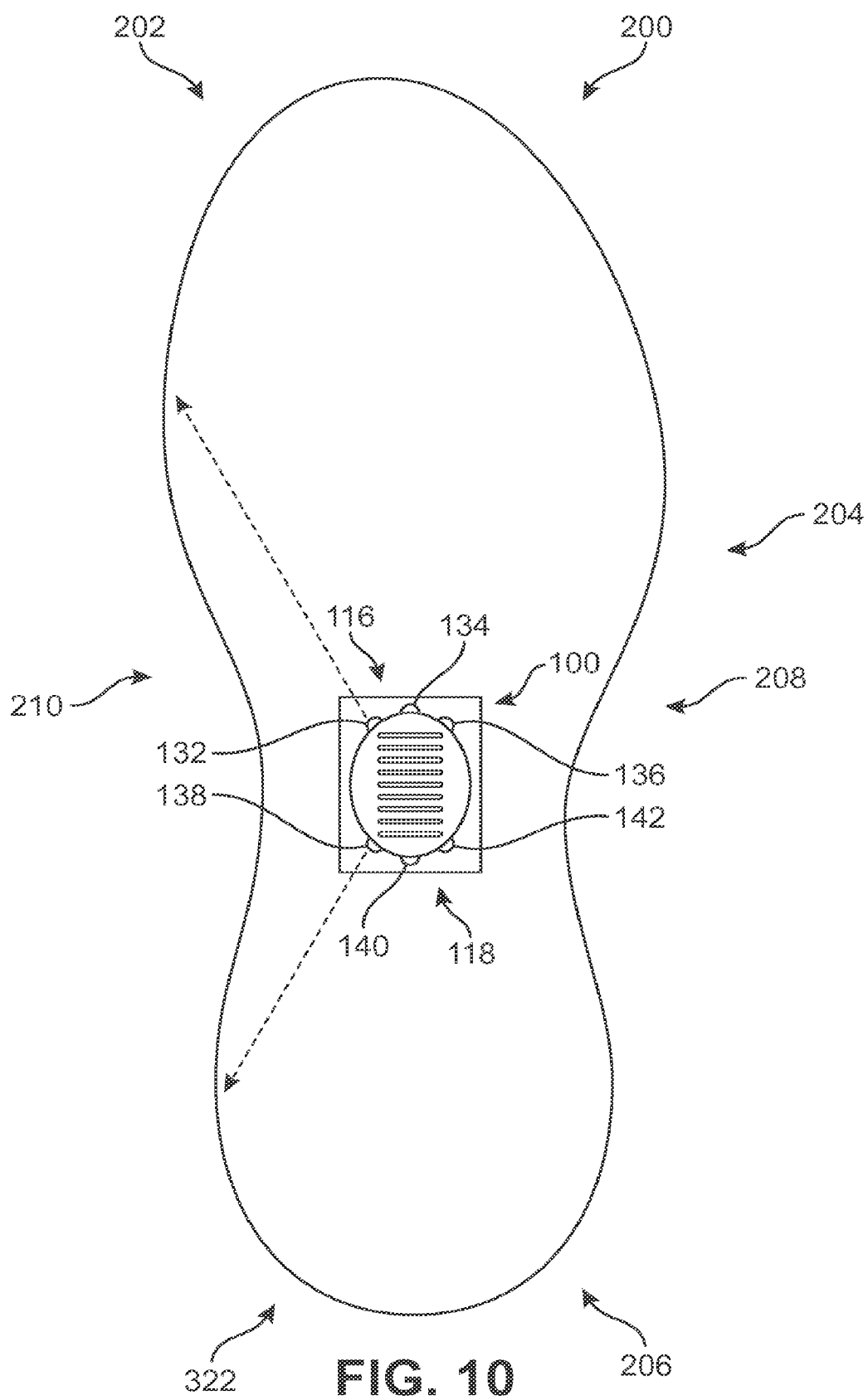

FIGS. 8 through 10 depict schematic top views of an exemplary bladder member 200 in a sequential illuminated state from lateral side 208 to medial side 210. In some embodiments, illumination device 100 can be programmed to emit light sequentially beginning at the lateral side 208 and ending at the medial side 210. In some other embodiments, the sequence can be reversed.

As shown in FIG. 8, light emitted from illumination device 100 passes through the interior of bladder member 200, illuminating lateral side 208 and exiting bladder member 200 and sole system 302 that are exposed to an exterior of footwear 300. In this exemplary embodiment, illumination device 100 illuminates lateral side 208 by illuminating third LED 136 and sixth LED 142 and turning off first LED 132, second LED 134, fourth LED 138, and fifth LED 140.

In FIG. 9, after light has been projected towards lateral side 208, illumination device 100 may transition towards medial side 210 by illuminating second LED 134, and fifth LED 140, while turning off the other illuminable elements 130. Finally in FIG. 10, illumination device 100 illuminates medial side 210 by illuminating first LED 132 and fourth LED 138 and turning the remaining illuminable elements 130. In some embodiments, illumination device 100 can then start the sequence over again and begin emitting light towards lateral side 208. In some other embodiments, illumination device 100 can be programmed to reverse the sequence instead, in other words, it illuminates bladder member 200 starting from medial side 210 and ending at lateral side 208.

Figure 11:
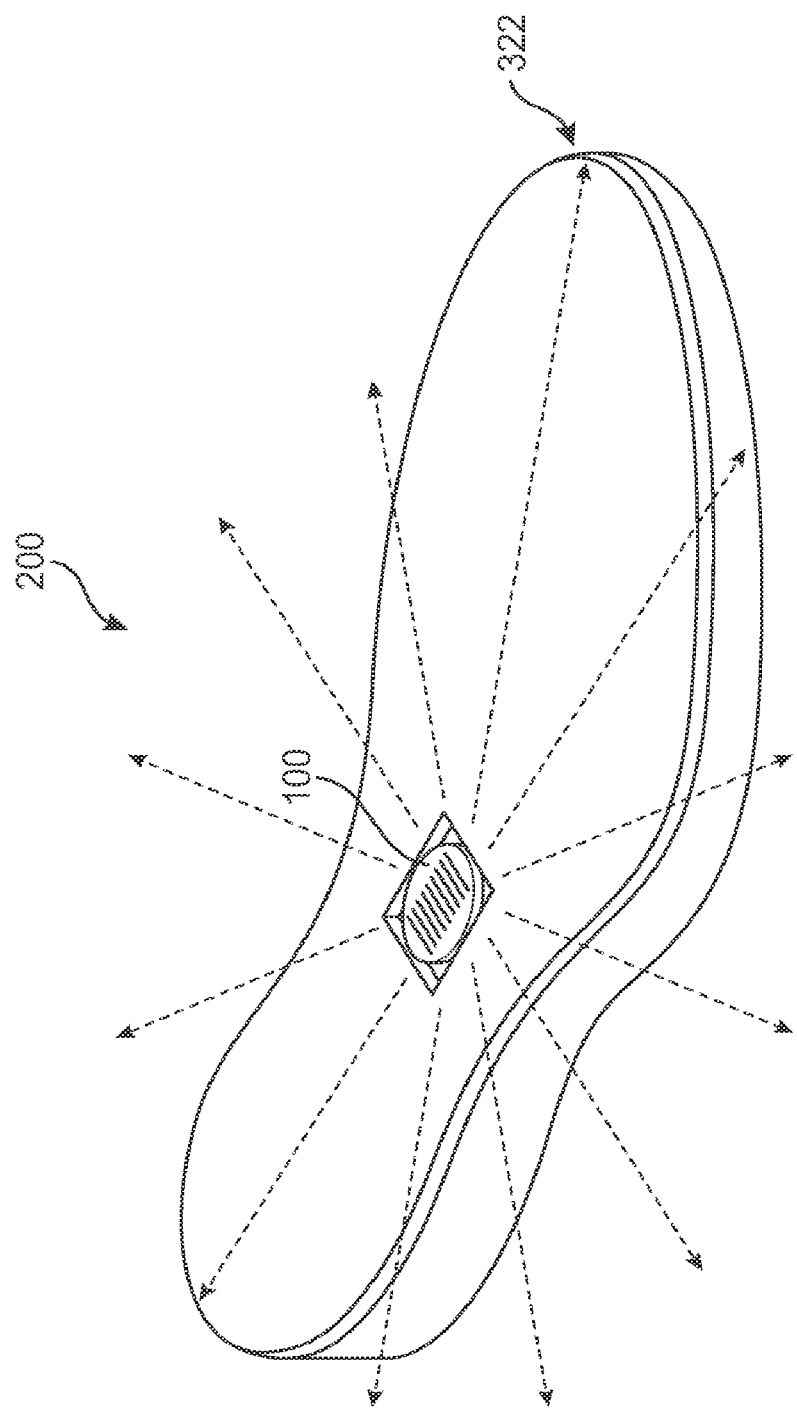
FIG. 11 is a schematic isometric view of an embodiment of a bladder member in a state of illumination.

FIG. 11 depicts an exemplary embodiment of transparent bladder member 200 and midsole member 322, in isolation, being illuminated with illumination device 100. Illumination device 100, as shown, is programmed to emit an illumination effect with a point illumination effect, in which light is emitted in equal brightness in all directions. In some embodiments, illumination device 100 can be programmed to emit only a single color. In some other embodiments, illumination device 100 can emit multiple light colors through bladder member 200.

In some other embodiments, an illumination device having illuminable elements such as RGB LEDs, can program illuminable elements, individually or grouped, to emit light in one or more colors. In still some other embodiments, the illumination device can be programmed to display a rotating set of desired colors. With a bladder member made from transparent materials, the illuminable elements will display a desired light color as it passes through the exposed surface of the sole system 302. In some other embodiments, where a bladder member is made from material dyed in either a single or multiple color, the illuminated or output light color being displayed through sole system 302 may be the same or different om the light color emitted by the illuminable elements.

Some articles of footwear may include provisions for illuminating sole systems having a multi-colored bladder member. In some embodiments, a sole system can have a multi-colored design, pattern, or visual appearance in which different portions of a bladder member have different colors. In some other embodiments, a sole system may include a multi-colored bladder member where a transition may be visible between two or more different portions having two or more different colors.

A bladder member may be colored using one or more dyes. Embodiments may use various different methods, process and systems for dyeing a bladder member or any other components of a sole system. Methods, processes, systems and dyeing materials are disclosed in the following documents, each of which is hereby incorporated by reference in their entirety: U.S. Pat. No. 7,611,547 to Bracken et al.; U.S. Patent Application Publication Number 2014/0250610, published on Sep. 11, 2014, titled "System and Method for Coloring Articles" to Schoborg; U.S. Patent Publication Number 2014/0250720, published on Sep. 11, 2014, titled "Multicolor Sole System" to Miner et al.; and U.S. Patent Application Publication Number 20140250735, published on Sep. 11, 2014, titled "Method of Making Multi-Colored Objects" to Edwards.

In some embodiments, a different illuminated or light color may be displayed when a bladder member is dyed with either a single color or multiple colors. For example, in some embodiments, if a bladder member is dyed in a red color, and the wearer of an article of footwear desires to have a color purple displayed, an illumination device may be programmed to take into account the bladder member color. Thus, for example, the illumination device may emit a light color of blue, through a bladder member dyed red, in order to display a sole system illuminated with the light color of purple. Therefore, the illumination device can be programmed any number of different ways in order for user to display a desired color or colors with a colored or multi-colored bladder member. Furthermore, as previously discussed, the illumination device can be programmed to additionally display any number of different illumination effects, or emit light based on other functionalities.

In some embodiments, different illumination modes may be programmed into an illumination device for lighting an article of footwear. Some articles of footwear having an illumination device may include provisions for changing the color of light to indicate certain functionalities. In some embodiments, an article of footwear may display an illuminated sole system based on functionalities programmed by a wearer. In some cases, a user may wish to program an illumination device to display one or more colors of light based on functionalities corresponding or related to movement. In some other cases, user may program an illumination device to display one or more colors of light based on a condition-responsive parameter that reaches a predetermined level.

In some embodiments, one or more condition-responsive parameters could be selected by a user and received by the illumination device. Such parameters may be referred to throughout this detailed description and in the claims as "user-selected condition-responsive parameters" or simply "user-selected parameters." Examples of user-selected parameters can include but are not limited to, motion, speed, ambient light conditions, or biological data such as a heartbeat. Such user-selected parameters could be variable and selected by a user via a computer system, mobile computing device or other provisions. It will be understood that in some embodiments, some parameters could be selectable by a user, while in other embodiments these parameters may not be selectable by a user. In other words, some parameters could be predetermined by a system and not a user in some embodiments.

FIGS. 12 through 15 illustrate an exemplary embodiment of a user 1000 programming an illumination device 100 by computer 1002 for various functionalities for article of footwear 300 having transparent bladder member 200. Generally, computer 1002 could be any type of computing device including, but not limited to: desktop computers, or laptop computers. In addition, the term computer can also include any other device that includes a display and a processor. Examples of such devices include, but are not limited to: PDA's, cell phones, smart phones, tablets, as well as other types of devices.

In some embodiments, illumination device 100 may be connected to computer 1002 using any types of connection known in the art. Examples of such connections include, but are not limited to: wired connections, wireless connections, or any other types of suitable connections.

Wired connections can be any cable or collection of wires that can be used to exchange information between an illumination device and a computer, for example, a Universal Serial Bus (USB). Furthermore, the wired connection could be associated with any type of connection, for example an IEEE 13394 interface (fire wire) could be used for data transfer. In addition, wired connections may be configured to transfer power between an illumination device and a computer. In some embodiments, a wired connection could be used to charge a power supply of an illumination device. In other embodiments, any other type of wired connection could be used.

In some cases, illumination device 100 may be connected to computer 1002 using a wireless connection 1004. Generally, wireless connection 1004 could be any type of connection known in the art that supports any type of wireless communication. In some cases, computer 1002 and illumination device 100 may communicate using a wireless network, Examples of such networks include, but are not limited to: personal area networks, local area networks, wide area networks, client-server networks, peer-to-peer networks, as well as other types of networks. In other cases, wireless connection 1004 could utilize the blue tooth wireless protocol. In still some other cases, wireless connection 1004 may use short range wireless technologies such as wireless USB.

Figure 12:
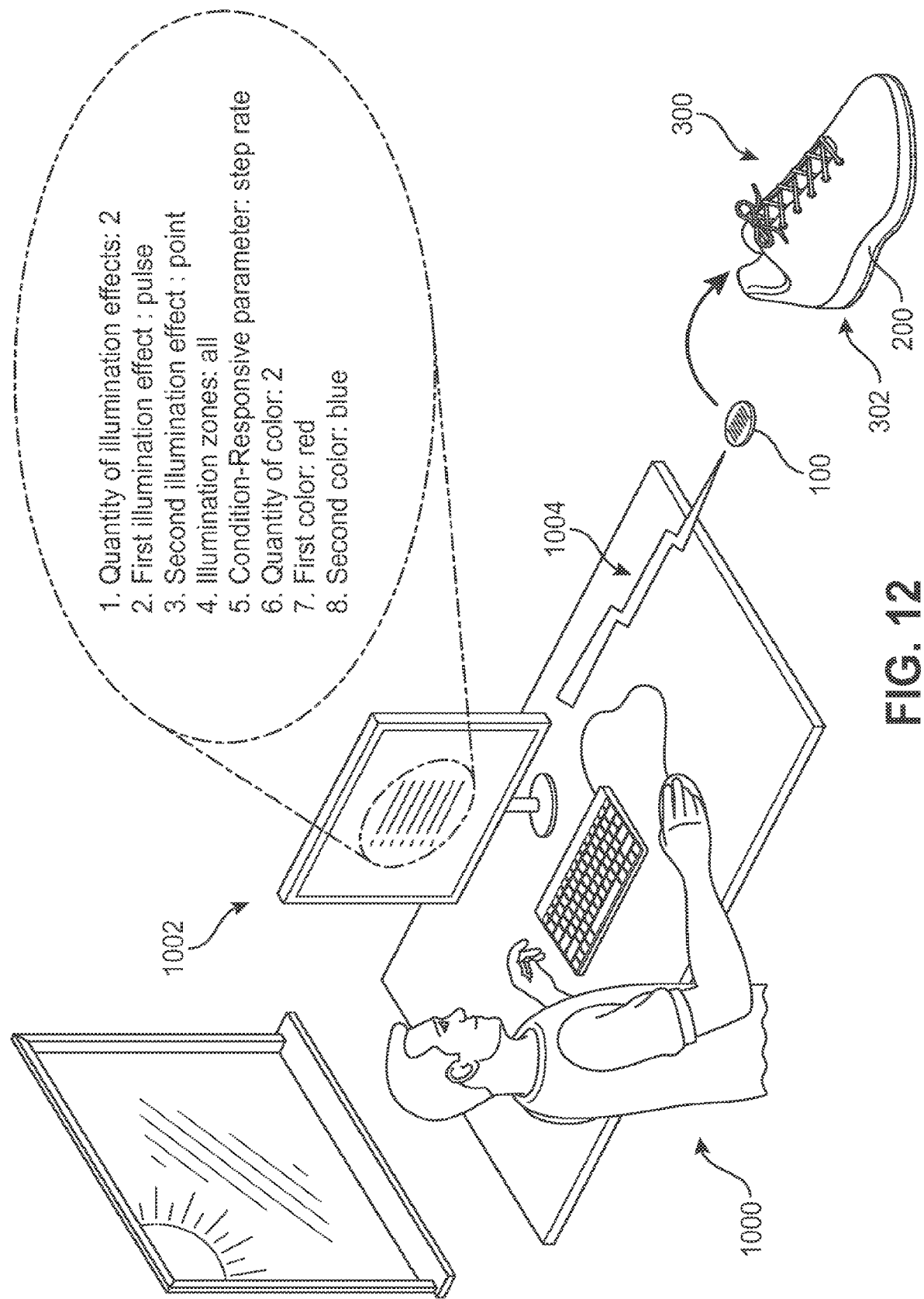
FIG. 12 is a schematic view of a user programming an embodiment of the illumination device, where the illumination device is in electronic communication with a computer.

For purposes of illustration, illumination device 100 and computer 1002 are shown within close proximity of one another in the current embodiment shown in FIG. 12. However, other embodiments may have illumination device 100 remotely connected to computer 1002 using a wireless network. Furthermore, in some cases, illumination device 100 could be connected to computer 1002 using a packet-switched communication system such as the Internet.

In some embodiments, illumination device 100 is programmed in association with a software interface that may be downloaded and/or run on computer 1002. The term "software interface" refers to any computer program, or collection of computer programs, that may be used as an interface for inputting information to, or receiving information from, illumination device 100. In some cases, software for interfacing with illumination device 100 could be stored on computer 1002. In other cases, software for interfacing with illumination device 100 could be associated with a control unit for an illumination device 100 that is accessed through computer 1002 when illumination device 100 is connected. This association allows software for interfacing with illumination device 100 to be used with any other computer that is capable of connecting with illumination device 100. Furthermore, software for interfacing may be updated thereby allowing user to download other illumination modes for programming illumination device 100.

In some embodiments, user can select or program illumination device 100 to illuminate a sole system in a variety illumination modes. As previously stated, illumination device 100 can be programmed to illuminate specific regions or illumination zones. Further, illumination device 100 can be programmed to illuminate a sole system based on different types of illumination effects: pulse, fade, etc. In some other embodiments, illumination device 100 can be programmed to emit light in different colors or a combination of colors depending on the type of illuminable elements 130 utilized. Further still, in some embodiments, illumination device 100 can be programmed to emit a desired output illuminated light color for a colored or multi-colored bladder member. Still in some other embodiments, illumination device 100 can be programmed by a user to illuminate a sole system based on a condition-responsive parameter: time of day, ambient light, velocity, etc. Therefore, a first illumination mode, for example, may be pulsing blue light in all directions of a bladder member and sole system. In some other embodiments, a second illumination mode could be fading red light from the heel region to the forefoot region, or the lateral side to the medial side.

In some embodiments, using the concepts described above, user 1000 may program illumination device 100 by wireless connection 1004 with computer 1002 as shown in FIG. 12. User 1000 may first determine a type of illumination effect previously discussed. In some cases, user 1000 may select one illumination effect or multiple illumination effects. In this exemplary example, an enlarged view of the terminal screen of computer 1002 depicts user 1000 selecting two (2) illumination effects. The first effect having the pulse illumination effect, and the second or final effect having the point illumination effect. In some other cases, user 1000 may designate various illumination zones or regions of sole system 302 for illumination, for example, a heel region to a forefoot region, a lateral side to a medial side, or in this exemplary embodiment all regions of sole system 302 of article of footwear 300. In another embodiment, user 1000 may program illumination device 100 to illuminate sole system 302 in response to certain condition-responsive parameters. In another embodiment, illumination device 100 may illuminate sole system 302 with an illumination effect based on a condition-responsive parameter, as programmed by user 1000. In still another embodiment, illumination device can illuminate sole system 302 with an illumination effect without needing a condition-responsive parameter. In this exemplary example, user 1000 programs illumination device 100 to emit light based on a condition-responsive parameter corresponding or related to motion or movement. In some other embodiments, user 1000 may select a quantity of light colors to display. In this exemplary embodiment, user 1000 selects two (2) light colors for illumination device 100 to display; the first programmed light color associated with the color red, and the second or final programmed light color associated with the color blue.

Figure 13:
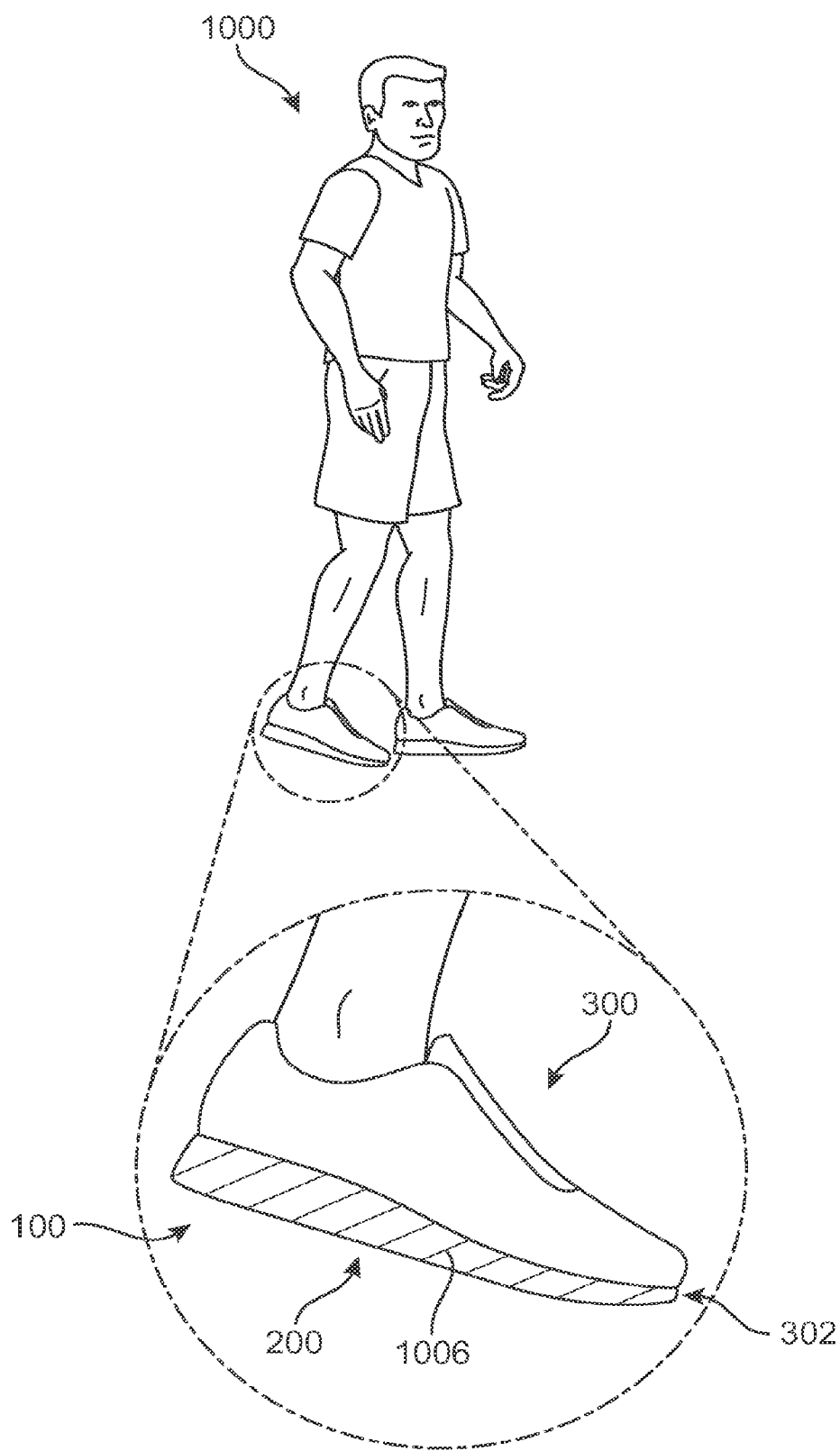
FIGS. 13-15 are schematic views of a user wearing an embodiment of an article of footwear with an illumination device.
Figure 14:
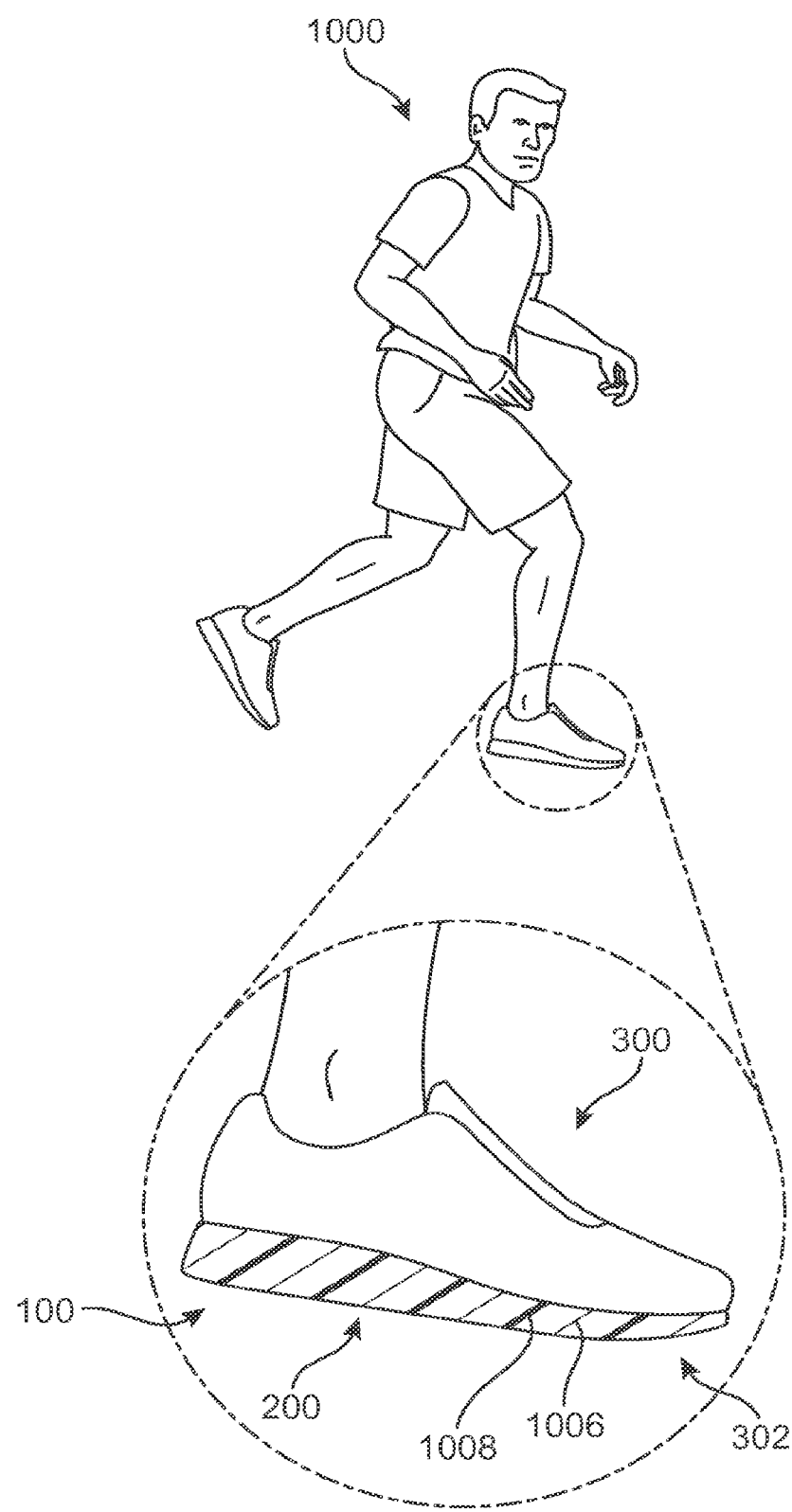
Figure 15:
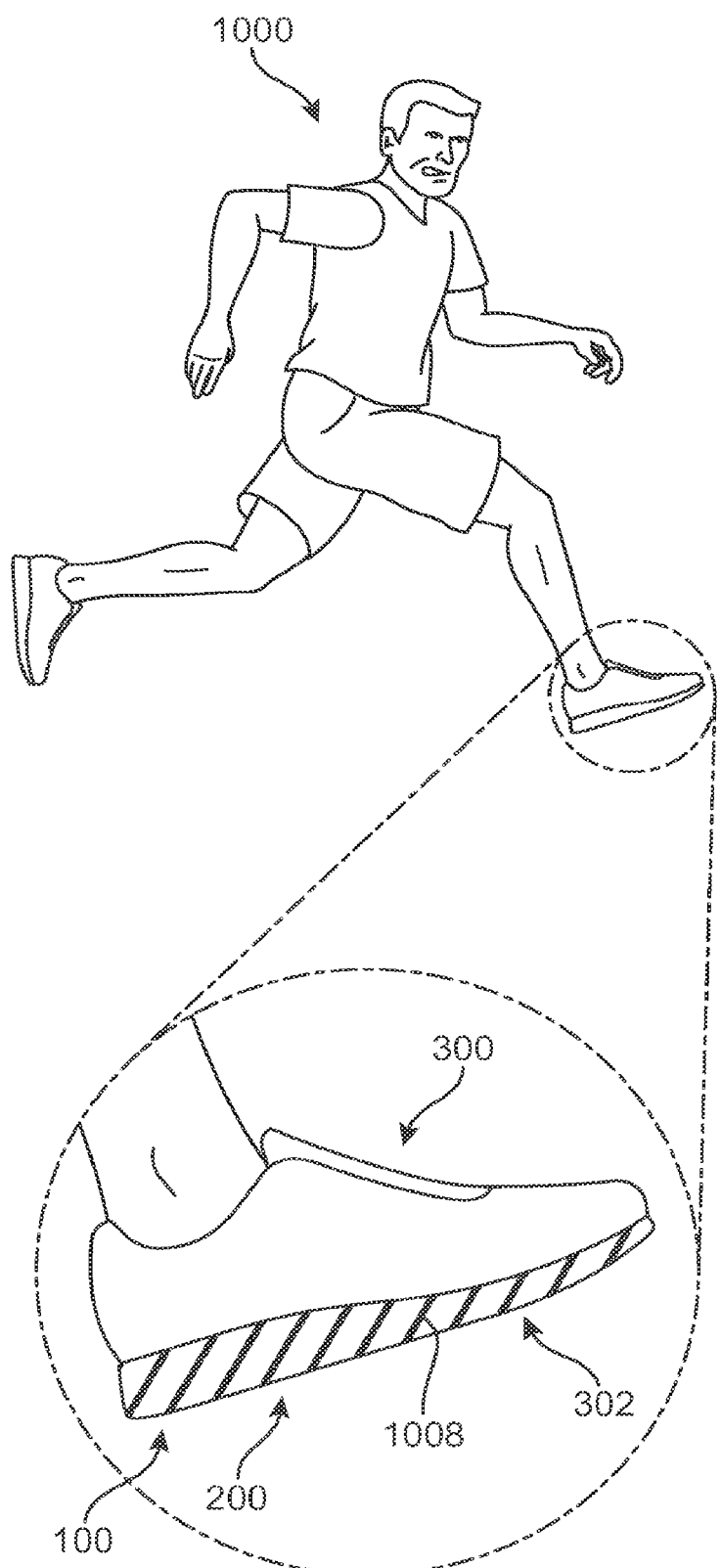

For purposes of illustration, FIGS. 13 through 15 as well as other figures in this detailed description make use of different shading, cross hatching, or stippling to indicate exemplary variations in color of a bladder member or light color from an illumination device across a sole system. Thus, for example, portions or regions of similar shading/stippling may be associated with a common color. Likewise, portions or regions with different shading/stippling may be associated with different color. In addition, FIGS. 13 through 15 as well as other figures in this detailed description make use of enlarged views of footwear undergoing various illuminated states in sequence.

FIG. 13 illustrates an exemplary embodiment of a user 1000 as he begins to walk wearing footwear 300 with illumination device 100. Illumination device 100 as programmed in FIG. 12, and in response to the movement, emits first programmed light color 1006 having the color red. Moreover, illumination device 100 emits first programmed light color 1006 with a pulse illumination effect. In other words, illumination device 100 emits a red color light, through all zones of the exposed surfaces of transparent bladder member 200 of sole system 302, fading in and out at regular intervals.

In some cases, as user 1000 gradually increases the intensity of motion from a walking motion to a jogging motion, illumination device 100 will begin to gradually emit second programmed light color 1008 having the color blue as illustrated in FIG. 14. Therefore, both a red light and a blue light will fade in and out at increasing intervals throughout all regions of bladder member 200 and sole system 302 in response to user's rapid movement. In other words, as illumination device 100 senses faster motion, the intervals at which first programmed light color 1006 and/or second programmed light color 1008 are emitted corresponds to the user's movement.

In some other embodiments, as user 1000 continues to increase speed, illumination device 100 will detect the increasing rapid movement and gradually increase the emission of second programmed light color 1008 while gradually decreasing the emission of first programmed light color 1006. In other words, as illustrated in FIG. 15, illumination device 100 in bladder member 200 will display more blue light throughout all regions of the bladder 200 as user 1000 becomes fully engaged in running, until illumination device 100 emits second programmed light color 1008 in equal brightness in all directions in all regions of sole system 302 of footwear 300. In other words, the second illumination effect, the point illumination effect, is now projected by illumination device 100. Thus, in this exemplary embodiment, the emission of second programmed light color 1008 or blue light from illumination device 100 in all directions and regions of sole system 302 signifies user 1000 is fully engaged in running and no longer walking.

Figure 16:
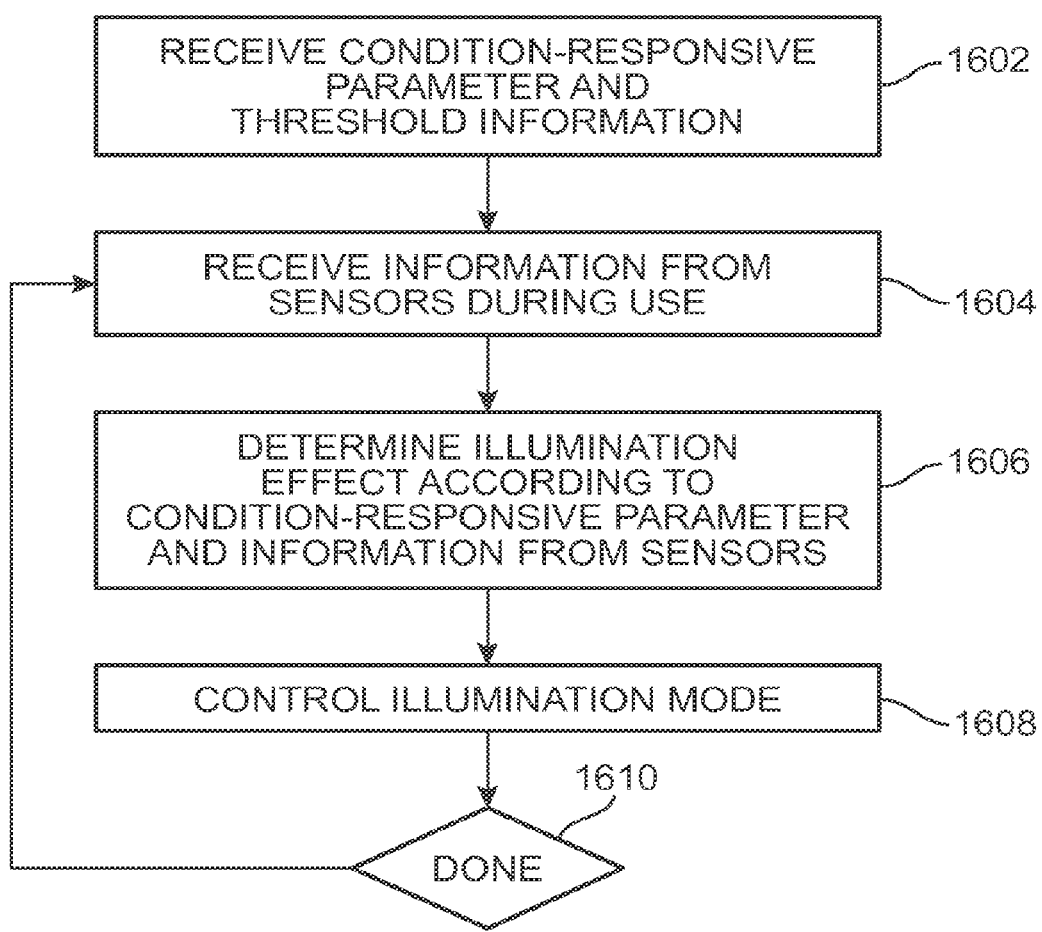
FIG. 16 is an embodiment of a process for controlling the illumination of a bladder member.

FIG. 16 illustrates an embodiment of a generic process for controlling an illumination device to emit light. In this embodiment, the following steps may be performed by a control unit located in the illumination device. In some other embodiments, these steps may be performed by additional systems or devices associated with the illumination device. For example, in some cases, including sensors or devices for measuring various parameters, one or more steps could be performed by sensors or other components. In addition, where the illumination device, located in a bladder member of a sole system for an article of footwear, is in electronic communication with a computer, as previously stated, one or more steps could be performed by the computer. In addition, it will be understood that in other embodiments, one or more of the following steps may be optional, or additional steps may be added.

During step 1602, the control unit may receive a condition-responsive parameter and initial threshold information. The term "condition-responsive parameter" as used throughout this detailed description and in the claims refers to any parameter associated with a state of a user and/or article worn by the user as well as a state of an environment where the article is worn. The condition-responsive parameter could be any parameter including, but not limited to: the number of heel strikes, the number of steps taken, the number of jumps performed, the temperature of a region of an article of footwear, the moisture of a region of the footwear, ambient temperature, ambient lighting conditions, as well as any other condition-responsive parameter. In some embodiments, the control unit for the illumination device could be configured to determine whether a user is moving faster or slower by sensors sensing pressure placed upon the illumination device during a certain time frame. In some other embodiments, the illumination device can be programmed to determine whether a user is moving faster or slower by the sensors determining the velocity of the runner. Moreover, the condition-responsive parameter can be determined from any information received from one or more sensors, including both sensors internal to the illumination device (e.g., within the housing the illumination device) or sensors external to the illumination device.

The term "threshold information" or "threshold value" as used throughout this detailed description and in the claims may refer to any information inputted by a user. In some embodiments, the threshold information could be related to an initial illumination mode. For example, in one embodiment, the threshold information could be related to a quantity of illumination effects, type of illumination effect, locations of sole structure designated for illumination, whether the sole structure is a specific color, or a desired output color.

During step 1604 information may be received from sensors in control unit during use. For example, the sensors in control unit may determine a velocity has been reached thereby causing the control unit to illuminate the sole structure in a selected illumination mode. In some embodiments, the control unit may store the information in memory associated with the control unit. In other cases, information could be stored in memory associated with another component of the illumination device.

During step 1606, the control unit may determine an illumination effect according to the condition-responsive parameter and information from sensors. In some cases, the control unit may assign a continuous illumination effect to each condition-responsive parameter. In other cases, the control unit may assign different illumination effects to discrete ranges of the condition-responsive parameter. For example, in the embodiment discussed with FIGS. 12 through 15, the control unit may emit light using a pulse illumination effect when sensors determine a velocity is less than three (3) miles per hour (mph). In addition, the control unit may emit a point illumination effect when sensors determine the velocity is greater than eight (8) miles per hour. In other embodiments, the control unit could determine a light color to display according to other condition-responsive parameters and information from sensors.

Next, in step 1608, the control unit may control the illumination mode. For example, if during step 1606 the control unit determined that the emission of light should be a point illumination effect based on a velocity of 8 mph or more, the control unit may control the illumination device to emit light in equal intensity in all directions as shown in FIG. 11. On the other hand, as the velocity decreases from 8 mph to less than 8 mph, the control unit may change the mode to a pulse illumination effect and control the illumination device to emit light by fading the light on and off at certain intervals. After step 1608, in step 1610, the process is done and the control unit will control the illumination mode based on updated information from the sensors in step 1604.

It will be understood that the control unit may be programmed to control the emission of light of the illumination device using active or passive methods. In some cases, the control unit may actively maintain an emission of light for illumination device by continuously sending electric signals (in the forms of currents or voltages) to the illuminable elements of the illumination device. In other cases, the control portion may passively control an emission of light when a change is needed. The use of either passive or active control methods may vary according to the type of light emitting technology used. In addition, some technologies could make use of a combination of active or passive control methods.

Figure 17:
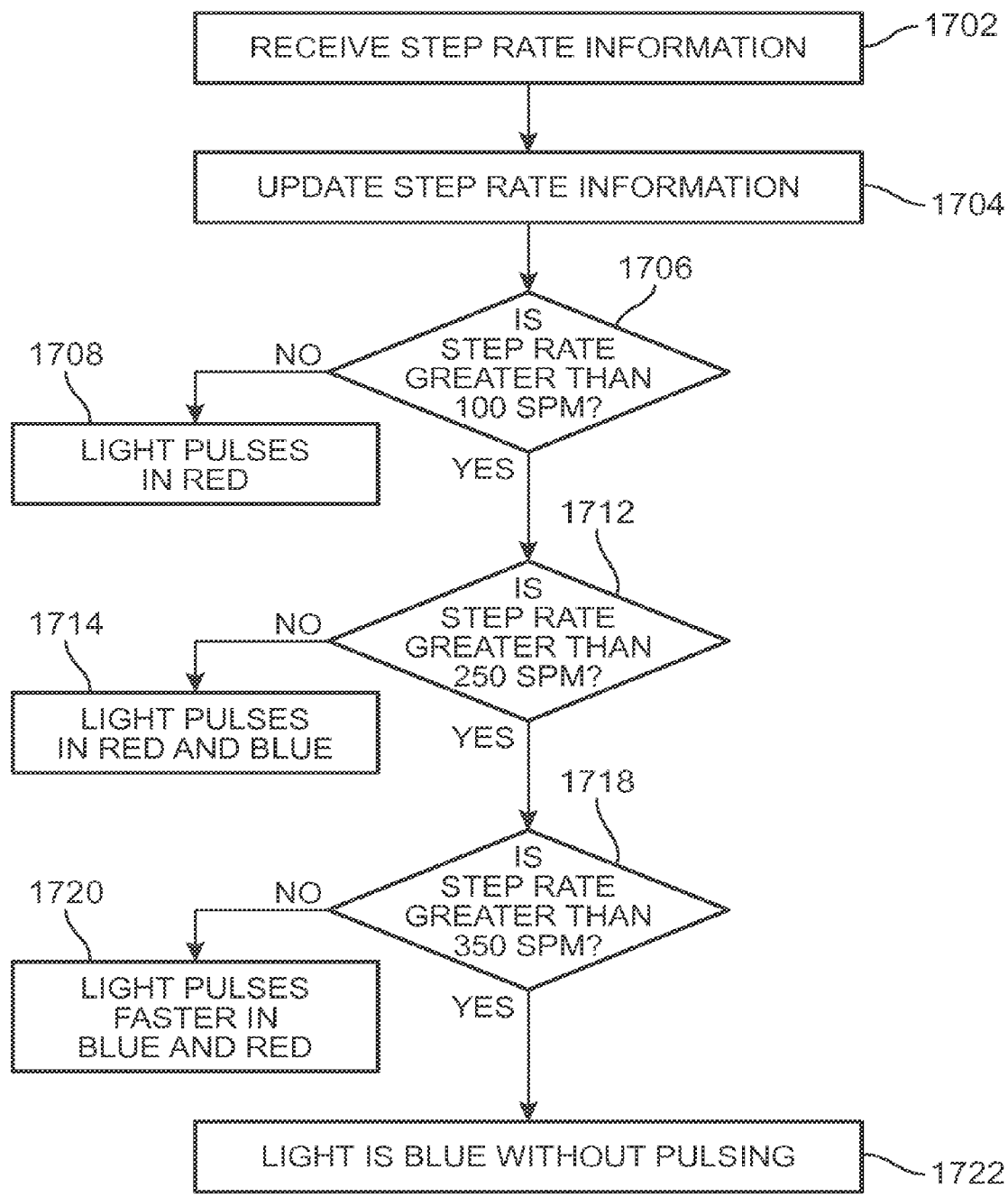
FIG. 17 is an embodiment of a process for controlling the illumination of a bladder member.

FIG. 17 illustrates an embodiment of a specific method for controlling an illumination device to emit light. In particular, FIG. 17 illustrates a method that could be used to emit light in the manner illustrated in FIGS. 12 through 15. In this embodiment, the following steps may be performed by a control unit of the illumination device. However, in some embodiments these steps may be performed by additional systems or devices associated with the illumination device. For example, in some cases, including sensors or devices for measuring various parameters, one or more steps could be performed by sensors or other components. In addition, where the illumination device, located in a bladder member of a sole system for an article of footwear, is in electronic communication with a computer, as previously stated, one or more steps could be performed by the computer. In addition, it will be understood that in other embodiments, one or more of the following steps may be optional, or additional steps may be added.

During step 1702, the control unit may receive or retrieve information corresponding to or related to movement or motion. In particular, the control unit could retrieve information related to a step rate event. In some embodiments, step rate information can be retrieved from a sensor located in the illumination device. In other cases, step rate information can be retrieved from other devices capable of measuring motion that may be disposed externally to an illumination device (e.g., sensors disposed within a sole member or an upper). For purposes of clarity, step rate may refer to the number of steps a user takes during a certain time frame while performing an activity such as walking, jogging, or running.

In some embodiments, the illumination device retrieves information related to a present value related to movement or motion. Following step 1702, during step 1704, the control unit may update step rate information, which is a variable that keeps track of the number of steps taken within a certain time frame (e.g. minute, hours, etc.). Next, during step 1706, the control unit may determine if the step rate is greater than 100 steps per minute (SPM). If the step rate is less than 100 steps per minute, the illumination device 100 emits an illumination effect with a pulse illumination effect in a light color of red as shown in step 1708. If, however, the step rate is greater than 100, the control unit may proceed to step 1712 and begin to emit a light color in red and a light color in blue with a slow pulse illumination effect. During step 1712, the control unit may determine if the step rate is greater than 250 steps per minute. If no, the control unit may proceed to step 1714 where the illumination device maintains emitting a red light color and a blue light color with a slow pulse illumination effect. Otherwise, the control unit may proceed to step 1718.

During step 1718, the control unit determines if the step rate is greater than 350 steps per minute. If the step rate is less than 350 steps per minute, the control unit may proceed to step 1720 where the illumination device maintains emitting a blue light color and red light color with a faster pulse illumination effect. Otherwise, the control unit proceeds to step 1722 and emits a blue light color without a pulse illumination effect and instead displays the point illumination effect. In other words, the bladder member of the sole system is fully illuminated in a blue light color in all regions or illumination zones.

It will be understood that in other embodiments, different threshold values could be selected by a user and retrieved by the illumination device. As discussed above, the exemplary embodiment uses a step rate threshold of 100, 250, and 350 steps per minute, corresponding approximately to the number of steps taken in different types of physical activities such as walking, jogging, and running. In other embodiments, the control unit of illumination device 100 may emit light according to other threshold values. In some other embodiments, the threshold values will correspond with or be related to what a user programs initially.

Some illumination devices can include provisions for calculating a desired color of light based on other information received. In some embodiments, a bladder member may be transparent or may comprise of portions having one or more different colors as previously described. In some other embodiments, a user may program an illumination device to illuminate a bladder member that has one or more colored portions. In still some other embodiments, a user can select a desired output illuminated light color for a colored or multi-colored bladder member by having the illumination device take into account the color or colors of the bladder member, in order to achieve the desired output illuminated light color displayed through the bladder member and sole system.

Figure 18:
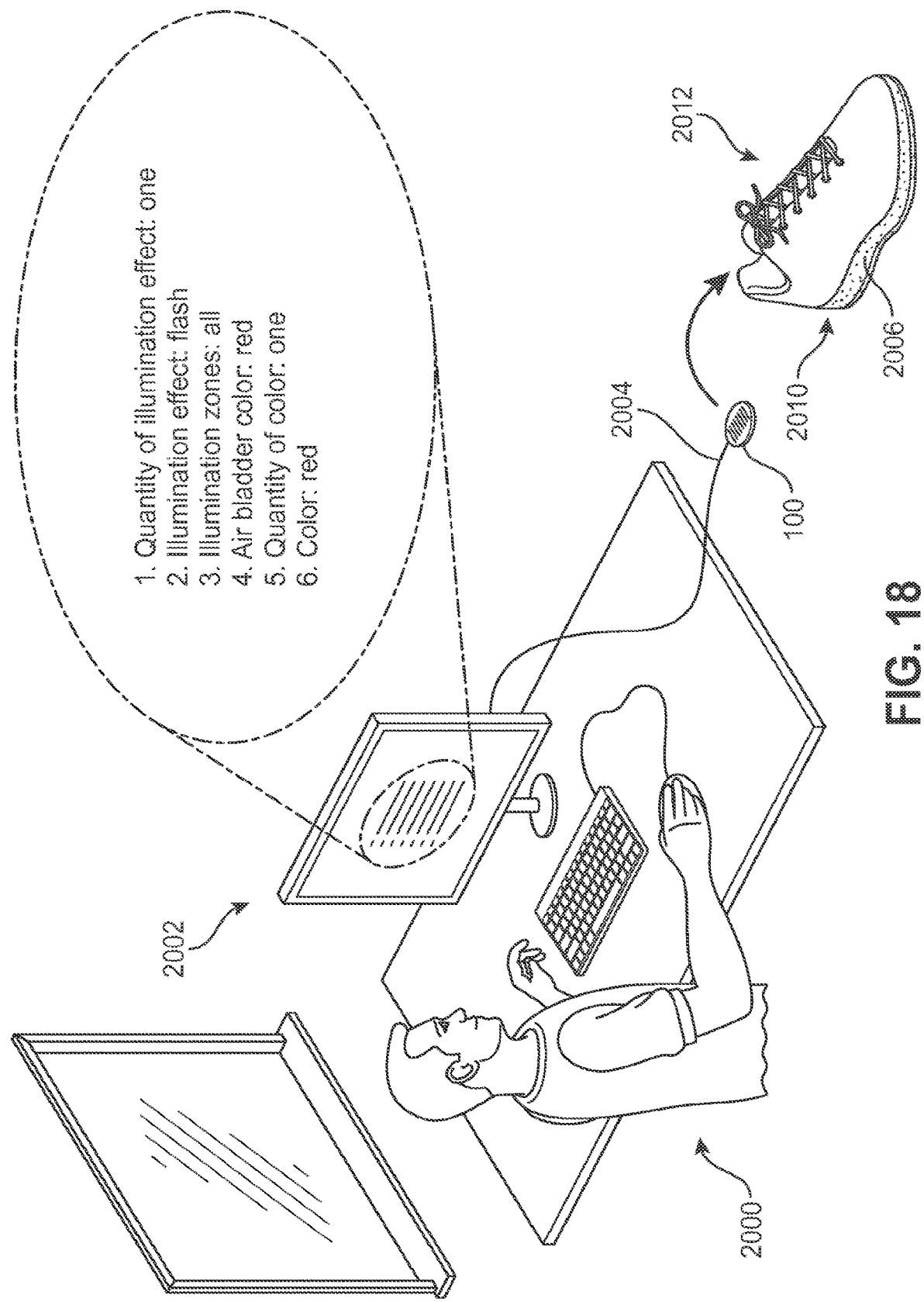
FIG. 18 is a schematic view of a user programming an embodiment of the illumination device, where the illumination device is in electronic communication with a computer.

In FIG. 18, an exemplary embodiment may have user 2000 communicate to illumination device 100 that bladder member 2006 comprises a color portion with the color red. In some embodiments, bladder member 2006 may comprise of additional color portions arranged in any number of different ways. As previously stated, user 2000 may also select which area or illumination zone of bladder member 2006 will be designated for illumination. Finally, user 2000 may select the desired output light color for bladder member 2006 of sole system 2010. In this exemplary embodiment, user 2000 selected red for the output light color for bladder member 2006. However, as stated previously, in some embodiments, a different illuminated or light color may be programmed into illumination device 100 and displayed when a bladder member is dyed with either a single color or multiple colors.

In some embodiments, user 2000 may program illumination device 100 by wired connection 2004 with computer 2002, as shown in FIG. 18. In some cases, user 2000 may select the quantity and type of illumination effect. In this exemplary embodiment, user 2000 selects illumination device 100 to emit the flash illumination effect. Therefore, with this illumination effect, the illumination device 100 will proceed to emit light on and off at random intervals. User 2000 then selects which regions of a bladder member 2006 of sole system 2010 for an article of footwear 2012 will be illuminated. In this exemplary embodiment, user 2000 selects all regions for illumination, in other words, illumination device 100 will emit light in all zones of bladder member 2006.

Figure 19:
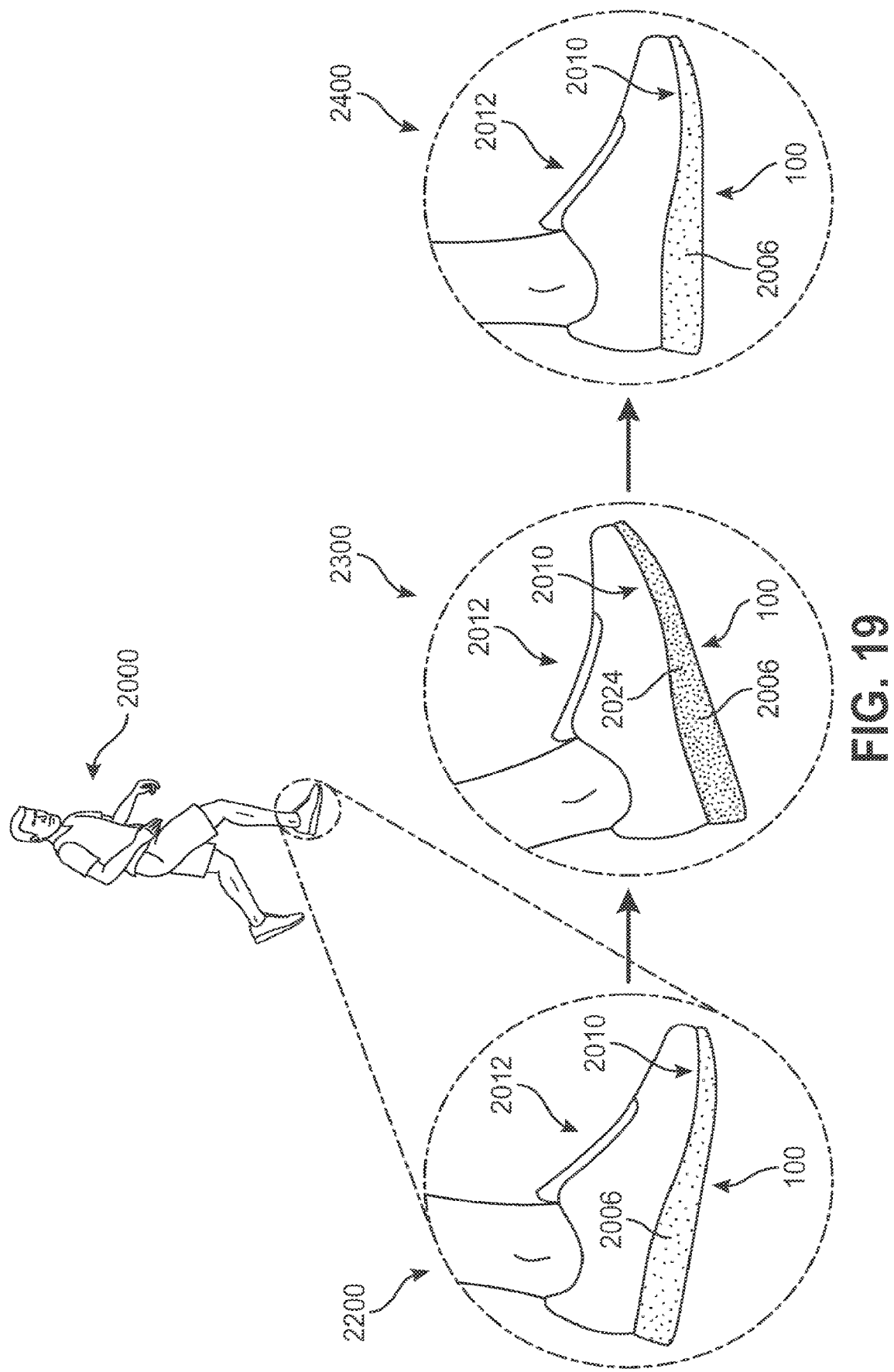
FIG. 19 is a schematic view of a user earing an embodiment of an article of footwear with an illumination device.

FIG. 19 illustrates an exemplary embodiment of user 2000, wearing article 2012 with sole system 2010 having a colored bladder member 2006 with programmed illumination device 100. In this exemplary embodiment, illumination device 100 will illuminate bladder member with programmed output light color 2024. Additionally, based on the desired programmed flash illumination effect, illumination device 100 emits the desired output light color 2024 on and off at random intervals at the selected illumination zones. Thus, the sole system 2010 is illuminated in all regions of sole system 2010 of article 2012. Specifically, in the exemplary embodiment, output light color 2024 is not visible in sole system 2010 in the first configuration 2200 of article 2012 but is visible in sole system 2010 in the second configuration 2300 of article 2012 shown in FIG. 19 because of the flash illumination effect. Finally, output light color 2024 is not visible in the third configuration 2400 of sole system 2010 shown in FIG. 19. Here, first configuration 2200, second configuration 2300 and third configuration 2400 occur in sequence according to the flash illumination effect.

For purposes of illustration and clarity, colored portions are only labeled on bladder member 2006 and sole system 2010 in the figures. However, as described above, both an outsole member and a midsole member may also have colored portions corresponding to colored portions of bladder member 2006. In other words, a midsole member may have a colored midsole portion. Likewise, the outsole member may have a colored outsole portion.

Figure 20:
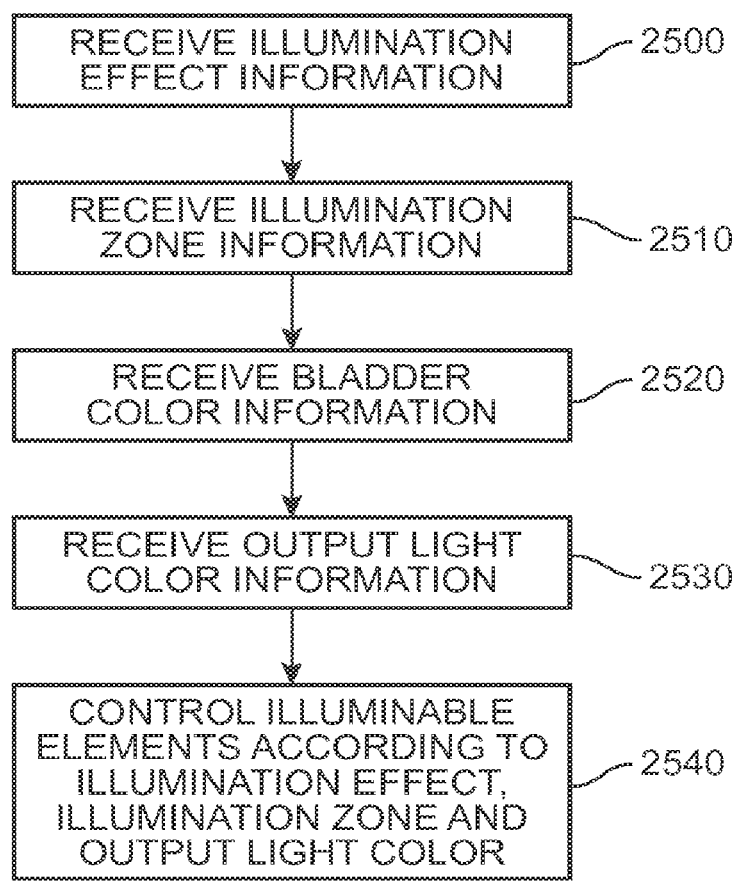
FIG. 20 is an embodiment of a process for controlling the illumination of a bladder member.

FIG. 20 illustrates an exemplary embodiment of a specific method for controlling an illumination device in an article of footwear to emit light based on a colored or multi-colored bladder. In particular, FIG. 20 illustrates a method that could be used to control an illumination device in a manner illustrated in FIGS. 18 and 19. In this embodiment, the following steps may be performed by a control unit; however in some embodiments these steps may be performed by additional systems or devices associated with the illumination device. For example, in some cases, including sensors or devices for measuring various parameters, one or more steps could be performed by sensors or components. In addition, where the illumination device, located in a bladder member of a sole system for an article of footwear, is in electronic communication with a computer, as previously stated, on or more steps could be performed by the computer. In addition, it will be understood that in other embodiments, one or more of the following steps may be optional, or additional steps could be added.

Referring to FIG. 20, user 2000 may wish to illuminate colored bladder member 2006 with illumination device 100. Illumination device 100 may receive an illumination mode information from user 2000. In some embodiments, illumination mode information corresponds or is related to illuminating colored bladder member 2006 with a specified illumination effect, such as the flash illumination effect, as shown in step 2500. Next, in step 2510, illumination device 100 may receive illumination mode information from user 2000 corresponding or related to emitting light in a specified illumination zone. Next, in step 2520, illumination device may receive information from user 2000 corresponding or related to a color of bladder member 2006. In step 2530, illumination device 100 may receive illumination mode information from user 2000 related to output light color from illuminable elements 130, such as the type of light color and quantity of light colors to emit. As stated previously, an illumination device having illuminable elements such as RGB LEDs, can be programmed, individually or grouped, to emit light in one or more colors. Finally, in step 2540, illumination device 100 illuminates colored bladder member 2006 and sole system 2010 of article of footwear 2012 by controlling illuminable elements according to the different illumination modes: illumination effect, illumination zone, and output light color, provided by user 2000.

In some embodiments, depending on the type of illuminable elements used by those skilled in the art, a user may be able to program illumination device 100 to illuminate a colored bladder member to achieve different effects. As stated previously, illumination device can be programmed to display a rotating set of desired colors using illuminable elements such as RGB LEDs. Therefore, when combined with a colored bladder member, a user may be able to illuminate colored bladder member with a different color when combined with the bladder member's external color.

An illumination device may include provisions to program an emission of light based on changing ambient light conditions. In some embodiments, a user may be outside wearing an article with an illuminated device emitting light based on a previously programmed mode. In some cases, based on changing conditions such as the weather or the time of day, a user may use a mobile device, such as a phone, to program the illumination device by changing the programmed illumination device to emit light with a different configuration.

Figure 21:
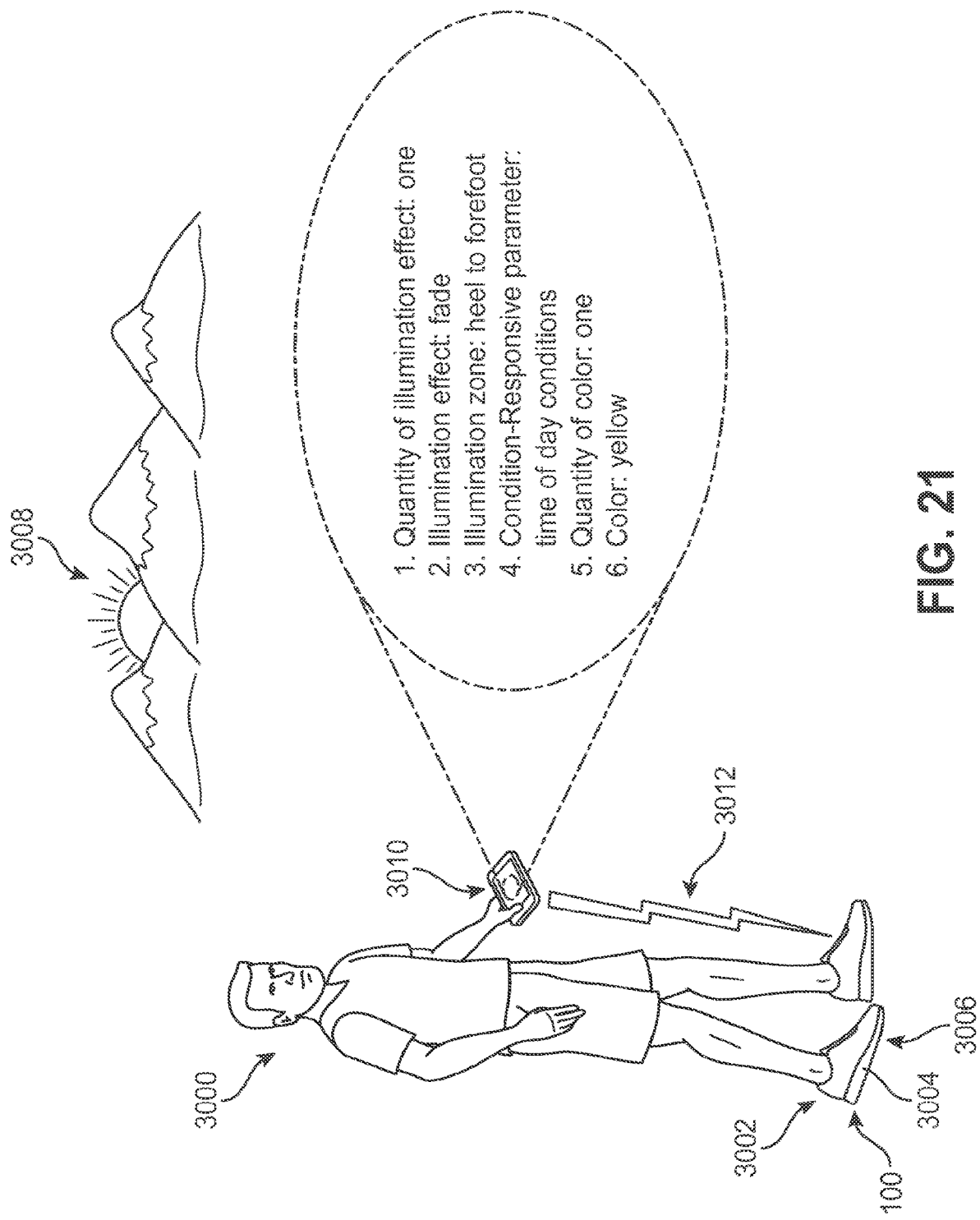
FIG. 21 is a schematic view of an embodiment of a user programming an embodiment of an illumination device for an article of footwear, where the illumination device is in electronic communication with a mobile device.
Figure 22:
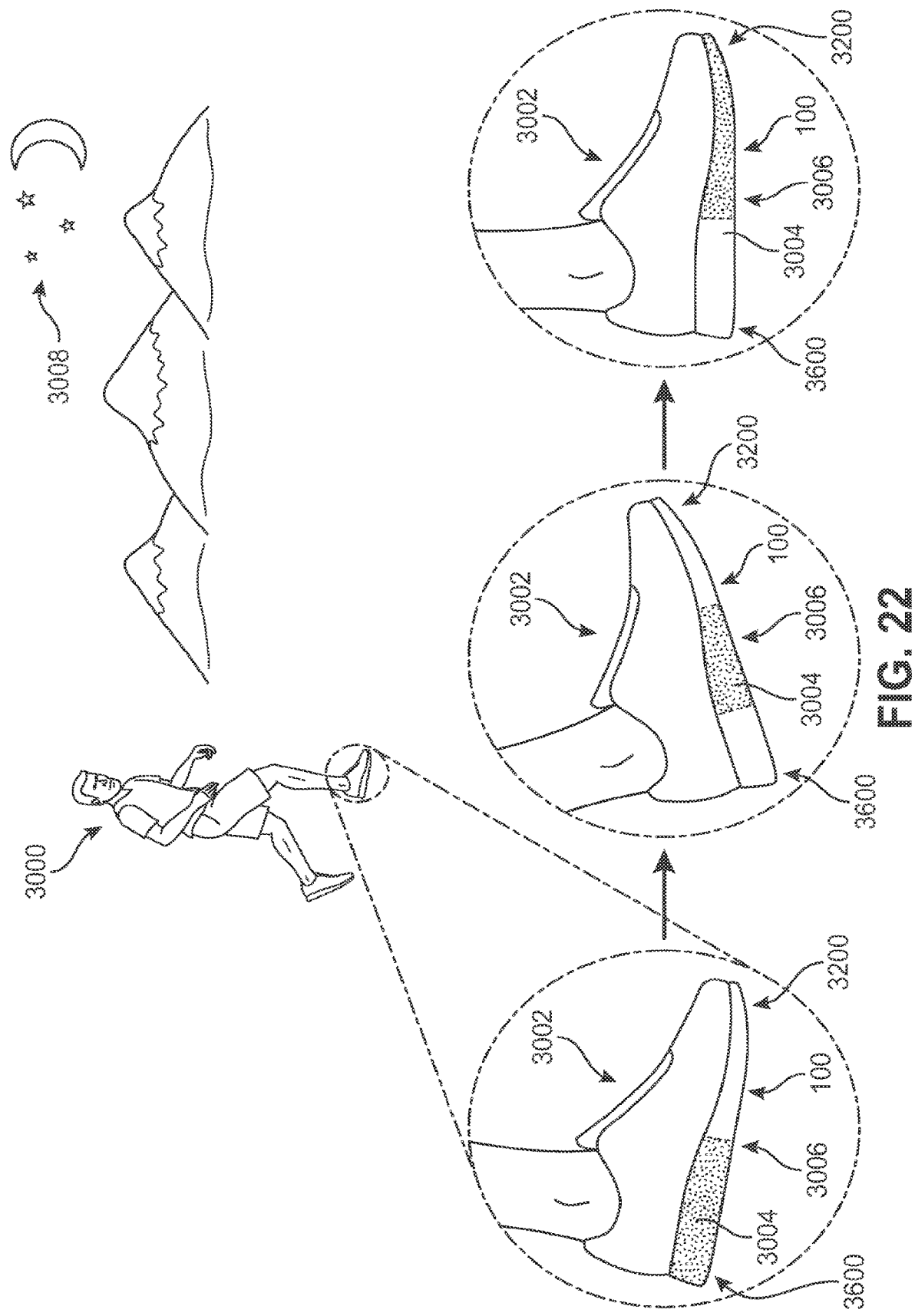
FIG. 22 is a schematic view of a user wearing an embodiment of an article of footwear with an illumination device.

Referring to FIGS. 21 and 22, in an exemplary embodiment, user 3000 may be outside with an article of footwear 3002 with an illumination device 100 in bladder member 3004 of sole system 3006. In some cases, illumination device 100 may be emitting light based on a previously inputted illumination mode. For example, user 3000 may have programmed illumination device 100 to illuminate article 3002 for a physical activity such as walking, during a certain time of day such as in the afternoon. Furthermore, while performing the physical activity, the time of day may change such as when afternoon changes into evening.

Referring to FIG. 21, in some embodiments, user 3000 may decide to change the type of light emitting from illumination device 100 to correspond with the time of day 3008. As used herein, the "time of day" could be determined according to a clock, for example, or alternatively could be determined by ambient lighting conditions. Thus, illumination device 100 may change an illumination mode according to either a time determined from a clock, or from sensing ambient lighting conditions. As previously explained, in some embodiments, user 3000 may use a mobile device 3010 to communicate wirelessly 3012 with illumination device 100. In an exemplary embodiment, mobile device 3010 is a smart phone. In some other embodiments, user 3000 may program illumination device 100 to illuminate sole system 3006 as the time of day conditions change from afternoon to evening. In FIG. 21, user 3000 programs illumination device 100 to illuminate sole system 3006 of article 3002 for evening. Furthermore, user 3000 selects an illumination effect and illumination zones. Therefore, as illustrated, illumination device 100 will emit light from the heel region to the forefoot region, using the fade illumination effect with a light color of yellow. In FIG. 22, as time of day 3008 changes from afternoon to sunset to evening, an enlarged view of article 3002 sequentially illustrates illumination device 100 illuminating bladder member 3004 of sole system 3006 from the heel region to the forefoot region with a fade illumination effect.

Figure 23:
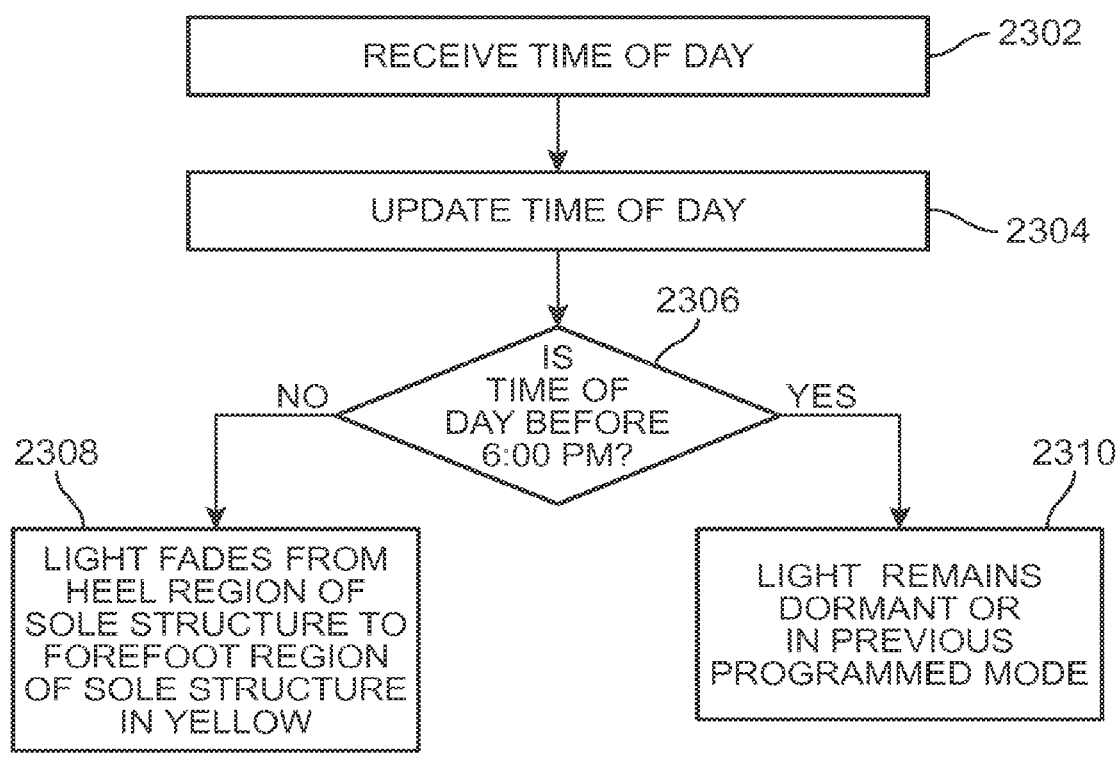
FIG. 23 is an embodiment of a process for controlling the illumination of a bladder member.

FIG. 23 illustrates an exemplary embodiment of a specific method for controlling an illumination device in an article of footwear to emit light based on changing conditions. In particular, FIG. 23 illustrates a method that could be used to control an illumination device in a manner illustrated in FIGS. 21 and 22. In this embodiment, the following steps may be performed by a control unit; however in some embodiments these steps may be performed by additional systems or devices associated with the illumination device. For example, in some cases, including sensors or devices for measuring various parameters, one or more steps could be performed by sensors or other components. In addition, where the illumination device, located in a bladder member of a sole system for an article of footwear, is in electronic communication with a computer, as previously stated, one or more steps could be performed by the computer. In addition, it will be understood that in other embodiments, one or more of the following steps may be optional, or additional steps could be added.

During step 2302, the control unit may receive information corresponding or related to a condition-responsive parameter. In particular, the control unit could receive information related to a time of day conditions (e.g. morning, afternoon, evening, or night). In some embodiments, time of day information can be received from an internal time keeping device (e.g., clock), or from remote information received wirelessly. Moreover, in an alternative embodiment, time of day information could be determined based on ambient light conditions. Such ambient light conditions could be determined by a sensor located in, or externally to, the illumination device. In other cases, time of day information can be received from other devices.

Following step 2302, during step 2304, the control unit may update the time of day information, which is a variable that keeps track of the time. Next, during step 2306, the control unit may determine if the time is before 6:00 P.M. which may signify when evening begins and thus signaling illumination device to engage in the illumination mode programmed by a user. If the time of day is after 6:00 P.M., the illumination device begins to fade light from the heel region to the forefoot region as shown in step 2308. If, however, the time is before 6:00 P.M., the control unit may proceed to step 2310, in which case the illumination device may remain dormant, or if the user desires to keep a previously programmed illumination mode, then the illumination device remains in that illumination mode.

It will be understood that in other embodiments, different threshold values could be selected. This exemplary embodiment uses a 6:00 P.M. as a threshold value. In other embodiments, the control unit of the illumination device may emit light according to other threshold values, including, for example, real time lighting conditions instead of using a threshold time (e.g., 6 p.m.).

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

What is claimed is:

1. A sole structure for an article of footwear including an upper, the sole structure comprising:
a bladder member having an interior cavity filled with a fluid, the bladder member including an upper surface opposing the upper, a lower surface opposing a ground-contacting surface of the sole structure, and a side surface extending (i) between the upper surface and the lower surface and (ii) around an entire perimeter of the sole structure; and
an illumination device operable to direct light into the interior cavity to illuminate the side surface around the perimeter of the sole structure at selective perimeter regions, the selective perimeter regions including a first illumination zone and a second illumination zone different than the first illumination zone.

2. The sole structure of claim 1, wherein the upper surface includes a recess extending into the interior cavity, the illumination device being disposed within the recess.

3. The sole structure of claim 2, wherein the illumination device selectively transmits light into the interior cavity through the upper surface.

4. The sole structure of claim 1, wherein the illumination device selectively transmits light into the interior cavity through the upper surface.

5. The sole structure of claim 1, wherein the illumination device includes a first light extending in a direction toward a medial side of the bladder member and operable to selectively transmit light toward the medial side, a second light extending in a direction toward a lateral side of the bladder member and operable to selectively transmit light toward the lateral side, and a third light disposed between the first light and the second light, extending in a direction along a longitudinal axis of the bladder member, and operable to selectively transmit light in a direction toward one of a forefoot region of the bladder member and a heel region of the bladder member.

6. The sole structure of claim 5, wherein at least one of the first light, the second light, and the third light is a light emitting diode (LED).

7. The sole structure of claim 1, wherein the illumination device is operable to illuminate the entire perimeter of the sole structure at the side surface.

8. The sole structure of claim 1, further comprising a controller operable to control the illumination device based on an operational state of the article of footwear.

9. An article of footwear incorporating the sole structure of claim 1.

10. A sole structure for an article of footwear including an upper, the sole structure comprising:
a bladder member having an interior cavity filled with a fluid, the bladder member including an upper surface opposing the upper, a lower surface opposing a ground-contacting surface of the sole structure, and a side surface extending (i) between the upper surface and the lower surface and (ii) around an entire perimeter of the sole structure; and
an illumination device operable to selectively illuminate the sole structure at the side surface around the entire perimeter of the sole structure in a first mode and at selective perimeter regions in a second mode, the selective perimeter regions including a first illumination zone and a second illumination zone different than the first illumination zone.

11. The sole structure of claim 10, wherein the upper surface includes a recess extending into the interior cavity, the illumination device being disposed within the recess.

12. The sole structure of claim 11, wherein the illumination device selectively transmits light into the interior cavity through the upper surface.

13. The sole structure of claim 10, wherein the illumination device selectively transmits light into the interior cavity through the upper surface.

14. The sole structure of claim 10, wherein the illumination device includes a first light extending in a direction toward a medial side of the bladder member and operable to selectively transmit light toward the medial side, a second light extending in a direction toward a lateral side of the bladder member and operable to selectively transmit light toward the lateral side, and a third light disposed between the first light and the second light, extending in a direction along a longitudinal axis of the bladder member, and operable to selectively transmit light in a direction toward one of a forefoot region of the bladder member and a heel region of the bladder member.

15. The sole structure of claim 14, wherein at least one of the first light, the second light, and the third light is a light emitting diode (LED).

16. The sole structure of claim 10, wherein the bladder member is pressurized.

17. The sole structure of claim 16, wherein the illumination device is operable to illuminate the side surface with different colors based on at least one condition-responsive parameter.

18. The sole structure of claim 17, further comprising a controller operable to control the illumination device based on an operational state of the article of footwear.

19. An article of footwear incorporating the sole structure of claim 10.

* * * * *